(12) United States Patent
Becerra

(10) Patent No.: US 6,215,261 B1
(45) Date of Patent: Apr. 10, 2001

(54) APPLICATION SPECIFIC INTEGRATED CIRCUIT FOR CONTROLLING POWER DEVICES FOR COMMUTATING A MOTOR BASED ON THE BACK EMF OF MOTOR

(75) Inventor: Roger C. Becerra, Wayne, IN (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/316,194

(22) Filed: May 21, 1999

(51) Int. Cl.[7] ................................. H02P 6/12; H02P 6/24

(52) U.S. Cl. ..................... 318/254; 318/375; 318/439; 388/907.5; 388/928.1

(58) Field of Search ........................... 318/138, 254, 318/375, 432, 433, 434, 439; 388/903, 907.5, 909, 928.1

(56) References Cited

U.S. PATENT DOCUMENTS

| | | | |
|---|---|---|---|
| 4,015,182 | 3/1977 | Erdman | 318/334 |
| 4,162,435 | 7/1979 | Wright | 318/138 |
| 4,459,519 | 7/1984 | Erdman | 318/254 |
| 4,491,772 | 1/1985 | Bitting | 318/254 |
| 4,492,903 | 1/1985 | Knight et al. | 318/341 |
| 4,494,055 | 1/1985 | Bitting et al. | 318/254 |
| 4,499,408 | 2/1985 | Bitting et al. | 318/254 |
| 4,500,821 | 2/1985 | Bitting et al. | 318/254 |
| 4,642,537 | 2/1987 | Young | 318/254 |
| 4,761,600 | 8/1988 | D'Arte et al. | 318/759 |
| 4,857,814 | 8/1989 | Duncan | 318/281 |
| 4,874,993 | 10/1989 | Tanaka et al. | 318/254 |
| 4,994,950 | * 2/1991 | Gritter | 318/811 |
| 5,036,264 | 7/1991 | Ueki | 318/254 |
| 5,045,988 | * 9/1991 | Gritter et al. | 363/35 |
| 5,057,753 | 10/1991 | Leuthold et al. | 318/254 |
| 5,130,620 | 7/1992 | Inaji et al. | 318/254 |
| 5,134,349 | 7/1992 | Kruse | 318/254 |
| 5,144,209 | 9/1992 | Ingji et al. | 318/254 |
| 5,162,710 | 11/1992 | Reinhart et al. | 318/254 |
| 5,166,583 | 11/1992 | Min et al. | 318/138 |
| 5,187,419 | 2/1993 | DeLange | 318/805 |
| 5,198,733 | 3/1993 | Wright | 318/254 |
| 5,202,613 | 4/1993 | Kruse | 318/254 |
| 5,202,616 | 4/1993 | Peters et al. | 318/254 |
| 5,233,275 | 8/1993 | Danino | 318/254 |
| 5,254,914 | 10/1993 | Dunfield et al. | 318/254 |
| 5,306,988 | 4/1994 | Carobolante et al. | 318/254 |

(List continued on next page.)

Primary Examiner—Bentsu Ro
(74) Attorney, Agent, or Firm—Senniger, Powers, Leavitt & Roedel; Damian Wasserbauer

(57) ABSTRACT

A motor for use with a power supply comprising a stator, a rotor in magnetic coupling relation to the stator, a plurality of insulated gate bipolar transistors (IGBTs), a user interface, a microcontroller and an application specific integrated circuit (ASIC). Each IGBT has a control input port and is connected between the stator and the power supply for selectively applying power to the stator in response to a control signal applied to the control input port. The user interface provides user signals indicative of one or more desired operating parameters of the motor. The microcontroller has control inputs receiving the user signals and has low voltage output ports for providing low voltage output signals for commutating the stator as a function of the user signals. The ASIC has low voltage input ports connected to the low voltage output ports of the microcontroller and has high voltage output ports connected to the control input ports of the IGBTs. The ASIC provides high voltage control signals via its high voltage output ports which high voltage control signals correspond to the low voltage output signals provided by the microcontroller. The ASIC provides commutation based on zero crossing intervals, pulse by pulse current regulation and dynamic braking. The ASIC includes a bidirectional state machine and a power on reset in the event that the control voltage for the switches is below a minimum.

17 Claims, 25 Drawing Sheets

U.S. PATENT DOCUMENTS

| | | | |
|---|---|---|---|
| 5,317,243 | 5/1994 | Cameron | 318/254 |
| 5,321,342 | 6/1994 | Kruse | 318/254 |
| 5,327,053 | 7/1994 | Mann et al. | 318/254 |
| 5,343,127 | 8/1994 | Maiocchi | 318/254 |
| 5,367,234 | 11/1994 | DiTucci | 318/254 |
| 5,382,889 | 1/1995 | Peters et al. | 318/254 |
| 5,384,527 | 1/1995 | Rozman et al. | 322/10 |
| 5,397,971 | 3/1995 | McAllister et al. | 318/254 |
| 5,397,972 | 3/1995 | Maiocchi | 318/439 |
| 5,423,192 * | 6/1995 | Young et al. | 62/228.4 |
| 5,492,273 * | 2/1996 | Shah | 236/44 A |
| 5,506,487 * | 4/1996 | Young et al. | 318/811 |
| 5,552,685 * | 9/1996 | Young et al. | 318/254 |
| 5,592,058 | 1/1997 | Archer et al. | 318/254 |
| 5,659,231 | 8/1997 | Svarovsky et al. | 318/368 |

* cited by examiner

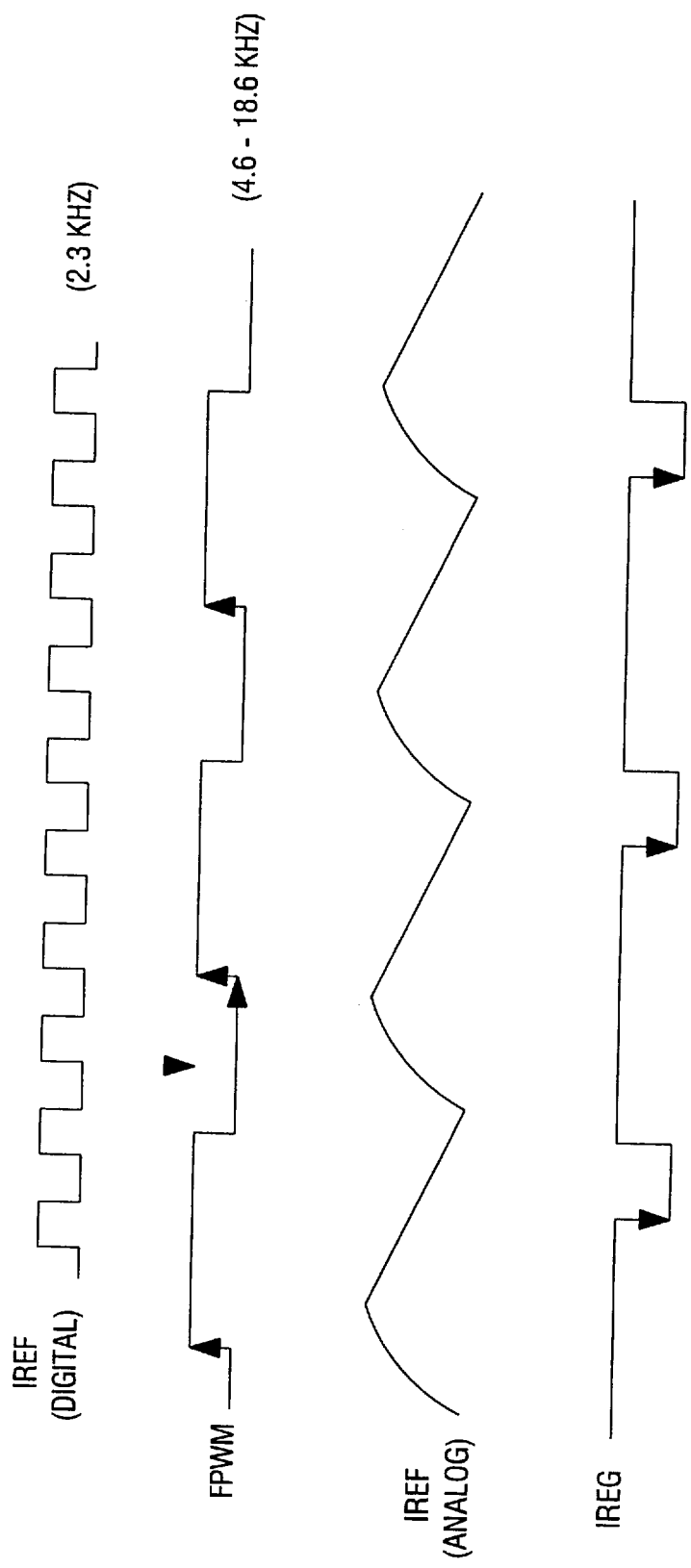

APPLICATION SPECIFIC INTEGRATED CIRCUIT FOR CONTROLLING POWER DEVICES FOR COMMUTATING A MOTOR BASED ON THE BACK EMF OF MOTOR

FIELD OF THE INVENTION

This invention generally relates to electronically controlled motors and to systems, such as heating, ventilating and/or air conditioning systems having motors therein operating according to predetermined parameters which are field selected by an OEM or installer before installation in order to correspond to the system in which the motor is to be installed.

DESCRIPTION OF THE PRIOR ART

While conventional brush-commutated DC motors may have advantageous characteristics, including convenience of changing operation speeds, there may be disadvantages such as brush wear, electrical loss, noise and radio frequency interference caused by sparking between the brushes and the segmented commutator, and overall material cost of the motor.

These disadvantages may limit the applicability of such brush-commutated DC motors in many fields, including the refrigeration, heating, ventilating and/or air conditioning (HVAC) fields. Electronically commutated motors, such as brushless DC motors and permanent magnet motors with electronic commutation, have now been developed and generally are believed to have the advantageous characteristics of brush-commutated DC motors without many of the disadvantages thereof while also having other important advantages. Such electronically commutated motors are disclosed in the David M. Erdman U.S. Pat Nos. 4,015,182 and 4,459,519, for instance. Such electronically commutated motors may be advantageously employed, for instance, in HVAC systems which employ variable speed motors.

Present motors have a variety of features and operational and system parameters which must be adjusted to optimize performance by providing a proper speed-torque characteristic for a particular application. Further, in many system applications, the starting torque and/or speed-torque characteristics of the motors must be predictable and repeatable. In addition, it is desirable that motors be operable at optimum efficiency consistent with mass production techniques. Known present variable speed motors cannot easily achieve this advantage because it has traditionally been impractical or too costly to minimize the variable effect on motor characteristics caused by manufacturing tolerances of the internal components of the motor. Present concepts and arrangements for adjusting a motor for different applications require circuit changes such as multiple variable resistors in the electronic control for the motor or permanent software changes in an electronic control microprocessor. Both of the aforementioned arrangements are disadvantageous because they require a unique model to be built for calibrating a system which cannot be easily changed and can be quite expensive.

U.S. Pat. No. 5,592,058 issued Jan. 7, 1997 is entitled "Control System and Methods for a Multiparameter Electronically Commutated Motor" by W. Archer, R. Becerra, B. Beifus, and M. Brattoli. The disclosure of this patent is incorporated by reference herein in its entirety. This patent is an example of an ASIC controlled motor which is programmable. There is a need for such a motor which uses insulated gate bipolar transistors. In addition, there is a need for such a motor which extends the motor safe operating area without the loss of synchronism at high speed and high torque. There is also the need for such a motor which provides better performance at start up and during asymmetric back emf waveforms.

SUMMARY OF THE INVENTION

The invention meets the above needs and overcomes the deficiencies of the prior art by providing: a system which permits interfacing defined parameters or characteristics of a motor with a memory associated with a control for an electronically commutated motor; a system which permits interfacing a system control signal with a motor control for the motor; a system which permits calibrating a motor control to actual characteristics or operating parameters of a motor while driving a known load; a system which permits calibrating the motor to a known load; a system which permits calibrating a motor control to motor characteristics under a no load condition; a motor controlled by a microcontroller via an application specific integrated circuit which controls insulated gate bipolar transistors for selectively energizing the motor windings; a system which permits sensing the position of a rotor of the motor for controlling torque and speed of the motor; a system which permits sensing asymmetric back electromotive force in a winding of the motor for sensing the position of the rotor and for controlling the motor in response thereto; a system which permits selecting varied frequencies of pulse width modulation for controlling the motor; a system which permits limiting current in the windings of the motor to a reference level; a system in a manner which is economically feasible and commercially practical; a system with an overcurrent circuit which provides a fast protection response and a tighter control of the overcurrent activation level and which provides a substitute for the costly and less accurate implementations of overcurrent protection circuits in the prior art; and a dynamic braking feature that reduces audible noise of a rotor driven blower/fan at coast down.

In one form, the invention comprises a motor for use with a power supply comprising a stator, a rotor in magnetic coupling relation to the stator, a plurality of inverter powers switches (IVPs), a user interface for providing user signals indicative of one or more desired operating parameters of the motor, a microcontroller and a high voltage silicon ASIC. Each switch has a control input port and is connected between the stator and the power supply for selectively applying power to the stator in response to a control signal applied to the control input port. The microcontroller has control inputs receiving the user signals and having low voltage output ports for providing low voltage output signals for commutating the stator as a function of the user signals. The high voltage silicon application specific integrated circuit (ASIC) has low voltage input ports connected to the low voltage output ports of the microcontroller and has high voltage output ports connected to the control input ports of the IVPs. The ASIC provides high voltage control signals via its high voltage output ports which high voltage control signals in response to the low voltage output signals provided by the microcontroller.

In another form, the invention comprises a motor for use with a power supply. A rotor is in magnetic coupling relation to a stator. A plurality of switches each have a control input port. The switches are connected between the stator and the power supply for selectively applying power to the stator D in response to a control signal applied to the control input port. A user interface provides user signals indicative of one or more desired operating parameters of the motor. A microcontroller has control inputs receiving the user signals and has low voltage output ports for providing low voltage output signals for commutating the stator as a function of the user signals. An application specific integrated circuit (ASIC) commutates the stator as a function of the low voltage output signals. The ASIC comprises a back emf sensing circuit connected to the stator providing a position signal indicative of the position of the rotor relative to the stator, wherein the back emf sensing circuit provides a zero crossing signal indicative of zero crossings of the back emf signal and wherein the ASIC includes an estimating circuit for commutating the windings as a function of the previous commutation interval between two consecutive zero crossings.

In another form, the invention comprises a motor for use with a power supply such as a voltage source inverter. A stator has a winding having three phases. A rotor is in magnetic coupling relation to the stator. A plurality of switches each has a control input port, the switches being connected between the stator and the power supply for selectively applying power to the stator in response to a control signal applied to the control input port. The switches include a first switch connected to one side of each phase and a second switch connected to the other side of each phase. A user interface provides user signals indicative of one or more desired operating parameters of the motor. A microcontroller has control inputs receiving the user signals and has low voltage output ports for providing low voltage output signals for the stator commutation as a function of the user signals. An application specific integrated circuit (ASIC) controls the switches to commutate the stator as a function of the low voltage output signals wherein the microcontroller, in response to a dynamic braking signal from the user interface, provides output signals which result in enabling or closing the first switches and disabling or opening the second switches.

In another form, the invention comprises a motor for use with a power supply. A rotor is in magnetic coupling relation to a stator. A plurality of inverter power switches (IVPs) is provided, each having a control input port and connected between the stator and the power supply for selectively applying power to the stator in response to a control signal applied to the control input port. A user interface provides user signals indicative of one or more desired operating parameters of the motor. A microcontroller has control inputs receiving the user signals and has low voltage output ports for providing low voltage output signals for commutating the stator as a function of the user signals. A high voltage silicon application specific integrated circuit (ASIC) has input ports connected to the output ports of the microcontroller and has output ports connected to the control input ports of the IVPs. The ASIC provides control signals via its output ports which control signals correspond to the control signals provided by the microcontroller. The ASIC comprises a comparator circuit receiving a current signal representative of the current circulating through a resistor on a DC link bus feeding the inverter and comparing the current signal to a reference representative of a maximum current, the comparator circuit inhibiting all power switches in the event that the applied current exceeds the maximum current.

Other objects and features will be in part apparent and in part pointed out hereinafter.

BRIEF DESCRIPTION OF THE DRAWINGS

FIGS. 2E, 2F and 2G illustrate the current regulator and related waveforms according to the invention.

Corresponding reference characters indicate corresponding parts throughout the drawings.

DETAILED DESCRIPTION OF PREFERRED EMBODIMENTS

Figure 1:
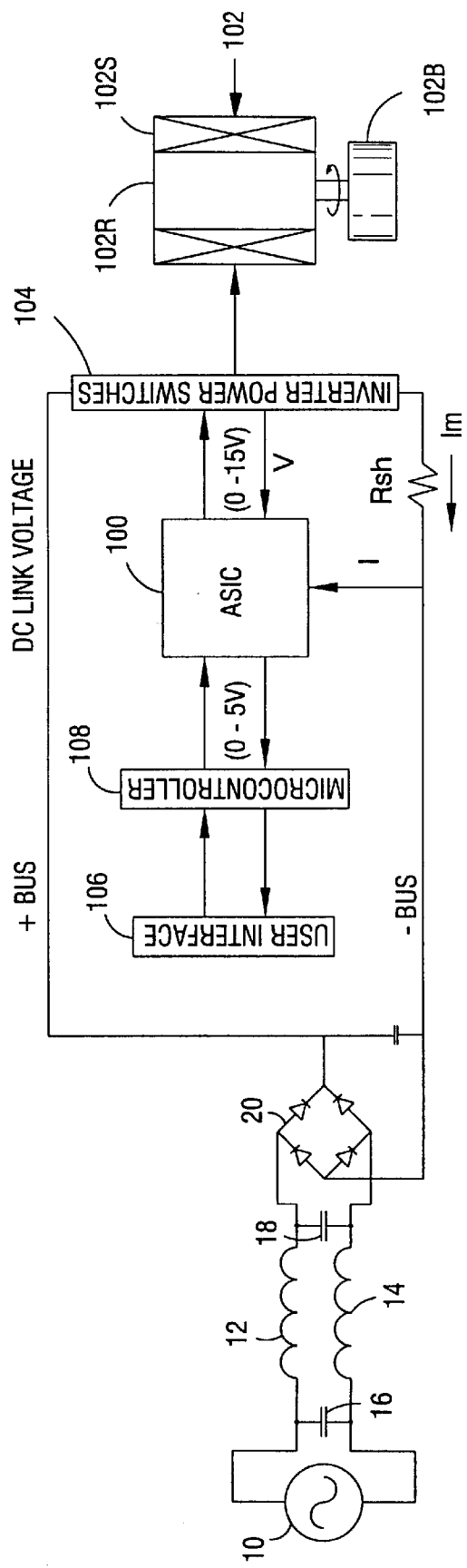
FIG. 1 shows a simplified block diagram of a typical ECM motor drive including the new motor controller and ASIC according to the invention.

As illustrated in FIG. 1, the invention relates to a high voltage silicon application specific integrated circuit (ASIC) 100 which functions as part of a controller for a motor. The motor is energized by an AC input power source 10 via an EMI input filter comprising serial inductors 12, 14 and parallel capacitors 16, 18. The filtered input voltage is rectified by rectifier 20 to provide DC voltage rails +Bus and −Bus. Rectifier 20, as illustrated in FIG. 1, comprises a diode bridge. In one preferred embodiment, the ASIC is used for controlling an electronically commutated motor (ECM) 102 having a stator 102S and a rotor 102R in magnetic coupling relation to the stator and mechanically coupled to a load to be driven, such as a blower 102B. Preferably, the ASIC 100 is a VLSI circuit that controls the operation of the ECM 102 by controlling an inverter 104 of six (6) power switches, such as insulated gate bipolar transistors (IGBT), which form a 3-phase inverter between the stator and a power supply (nominally up to 600 volts). The control of the inverter 104 is based on user commands provided via a user interface 106. In this drive configuration, user commands provided via the user interface 106 are read by the microcontroller 108 which in turn transforms signals corresponding to the commands into command signals for the ASIC 100. The user interface 106 provides user signals indicative of one or more desired operating parameters of the motor. The ASIC controls the ECM 102 operation by opening or closing the power switches of the inverter 104 so that power is selectively applied to the stator. Phase signals corresponding to the motor phase back emf voltage signals (V, ZCA, ZCB, ZCC) are provided as feedback signals (V) to the ASIC 100 for use in sensing rotor position. Current signals corresponding to motor current (I, $I_M$, $I_{REG}$) are sensed in one of the DC link power buses feeding the inverter by a small shunt resistor RSh and are provided as feedback signals (I) to the ASIC 100 for use in controlling power applied to the ECM. The DC link voltage is derived from a rectified and filtered AC source of 120/240/277VAC (not shown in the figure).

The microcontroller 108 has low voltage output ports which provide low voltage signals (0–5 volts) for commutating the stator 102S as a function of the user signals. The ASIC 100 has low voltage input ports connected to the low voltage output ports of the microcontroller 100. In addition, the ASIC 100 has high voltage output ports connected to control input ports of the IGBTs so that the ASIC provides high voltage control signals (0–15 volts) via its high voltage output ports which high voltage control signals correspond to the low voltage outputs signals provided by the microcontroller.

Figure 2A:
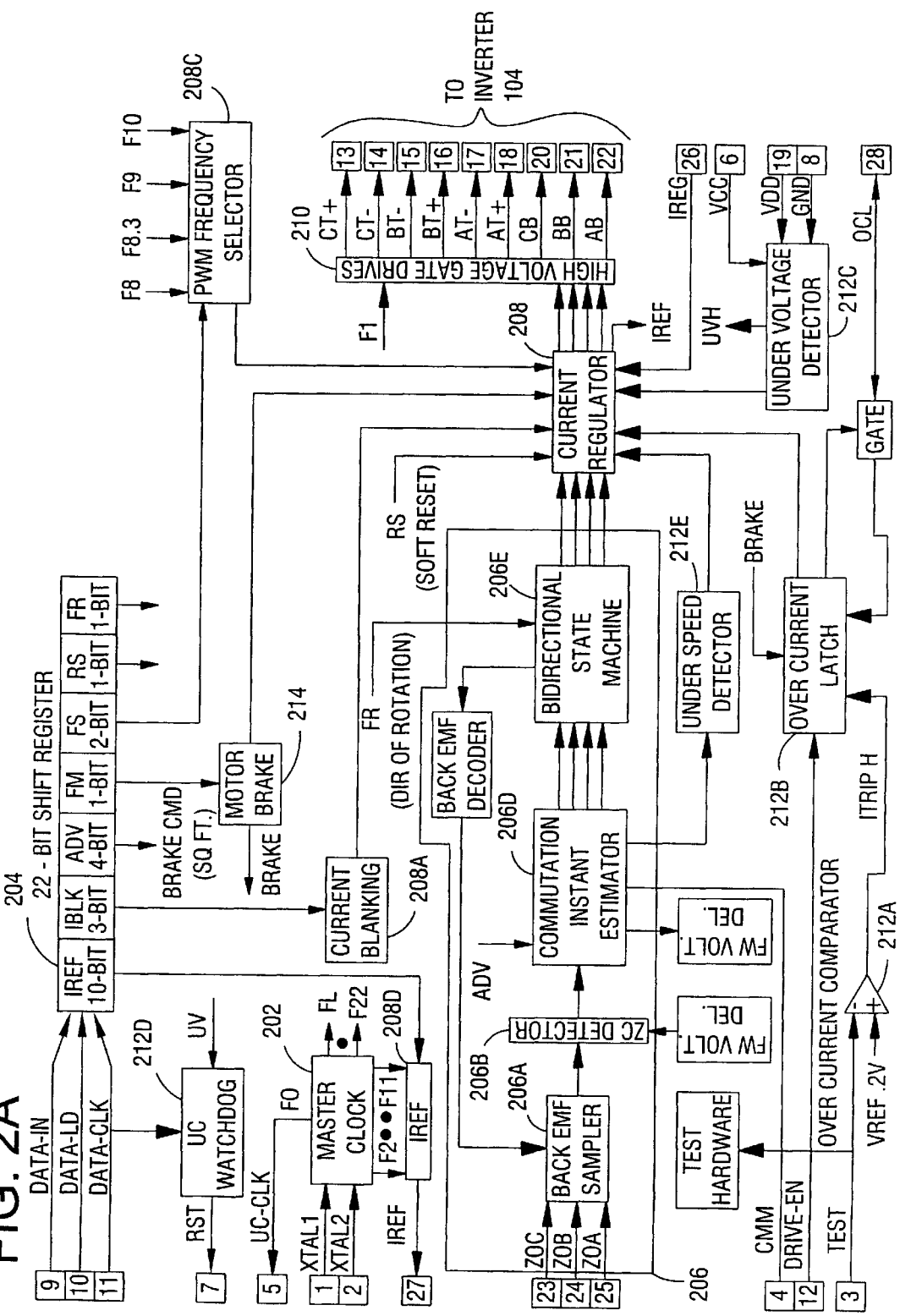
FIG. 2A illustrates a block diagram of various components of the new ASIC 100 of the motor controller according to the invention.

FIG. 2A illustrates a block diagram of various components of the new ASIC 100 motor controller. The timing for the control is generated in a master clock 202 including a high frequency resonator-based oscillator in the ASIC 100. The microcontroller 108 interfaces with ASIC 100 via low voltage (0–5V) signals. Microcontroller 108 commands the operation of ASIC 100 via a 3-signal serial communication interface. This ASIC interface 106 comprises a serial communication interface such as a 22-bit shift register 204 that configures the ASIC 100 in various operation modes. Operating commands are loaded serially into the register from the microcontroller 108 via any communication protocol. This arrangement allows the operating parameters of the ASIC 100 and, as a result, the operation of the ECM 103 to be modified while the ECM is operating.

SERIAL INTERFACE

In particular, the interface consists of a 22 bit register controlled by 3 command lines: DATA-IN, for the data; DATA-CLK, shifts one bit at a time into the register; and DATA-LD, signals the serial register controller that the shifting process is completed. Loading data into the register is controlled by a internal signal after the DATA-LD has occurred.

Serial interface fields:

| Field | Description |
| --- | --- |
| FR | Direction of rotation (forward/reverse) |
| RS | Reset overcurrent trip latch (transition 0>1 = reset, o.w. = normal) |
| F0-F1 | PWM frequency selection (00 = 18.6 kHz, 01 = 9.32 kHz, 10 = 4.6 KHz, 11 = 6.2 KHz) |
| FM | 0 = Normal slow commutation, 1 = Brake |
| A3-A0 | Commutation advance angle (A3 is MSB) |
| K2-K0 | Current blanking (blanking interval) |
| I9-I0 | 10 bit current reference (digital comparator) |

TABLE 1 illustrating serial interface fields:

| 19 | 18 | 17 | 16 | 15 | 14 | 13 | 12 | 11 | 10 | K2 | K1 | K0 | A3 | A2 | A1 | A0 | FM | F1 | F0 | RS | FR | NAME |
| --- | --- | --- | --- | --- | --- | --- | --- | --- | --- | --- | --- | --- | --- | --- | --- | --- | --- | --- | --- | --- | --- | --- |
| IREF | | | | | | | | | | Iblk | | | ADVANCE | | | | | PWM | | | | |
| 21 | 20 | 19 | 18 | 17 | 16 | 15 | 14 | 13 | 12 | 11 | 10 | 9 | 8 | 7 | 6 | 5 | 4 | 3 | 2 | 1 | 0 | ORDER |

Loading of serial data into AHDC

Figure 14:
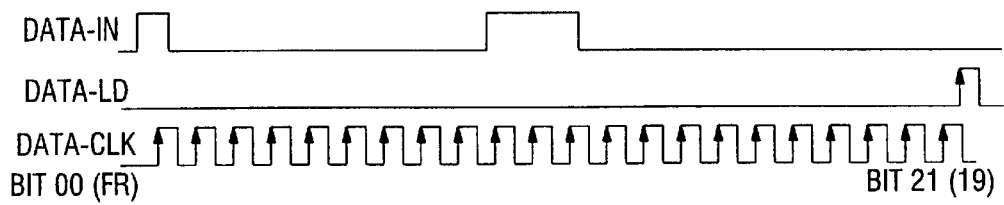
FIG. 14 illustrates the waveforms associated with the loading of serial data into the ASIC.

FIG. 14 shows the 3 inputs to the ASIC associated with loading serial data (DATA_IN) into the ASIC registers. The data stream is clocked bit by bit into a register by the rising edge of signal DATA_CLK. After all data is clocked, the rising edge of signal DATA_LD commands the register control to latch data into register. Bit 00 is clocked first into shift register.

Referring again to FIG. 2A, block 206 includes circuits for rotor position sensing, bidirectional state machine commutation, and a commutation angle estimator. This block provides one of the core functions of the ASIC because it incorporates a mechanism to start and synchronize the ECM 102. Also, it incorporates an effective method to estimate the electric angle to commutate the ECM 102.

Figure 2B:
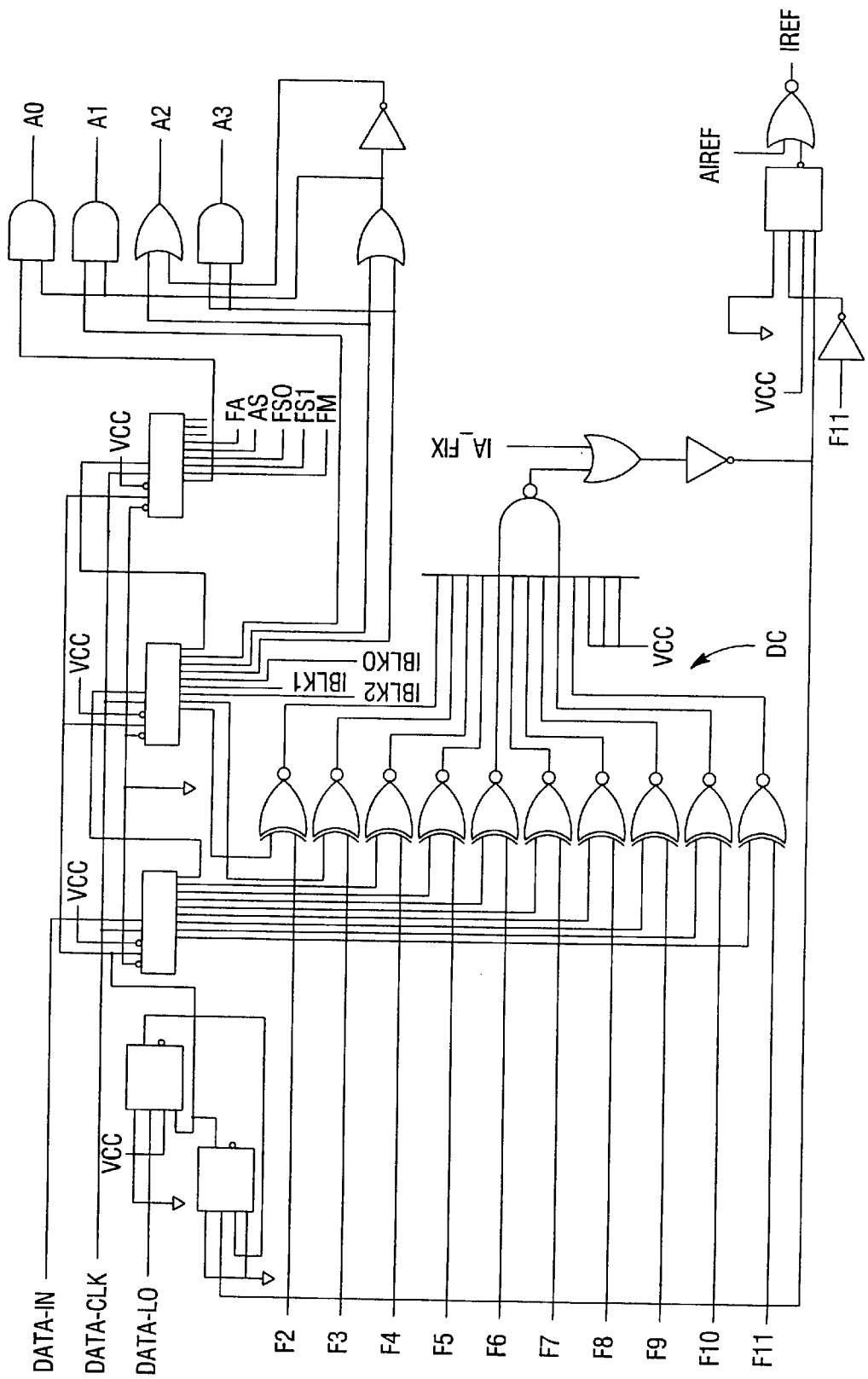
FIGS. 2B and 2C are schematic diagrams of various components of the new ASIC 100 motor controller according to the invention.
Figure 2C:
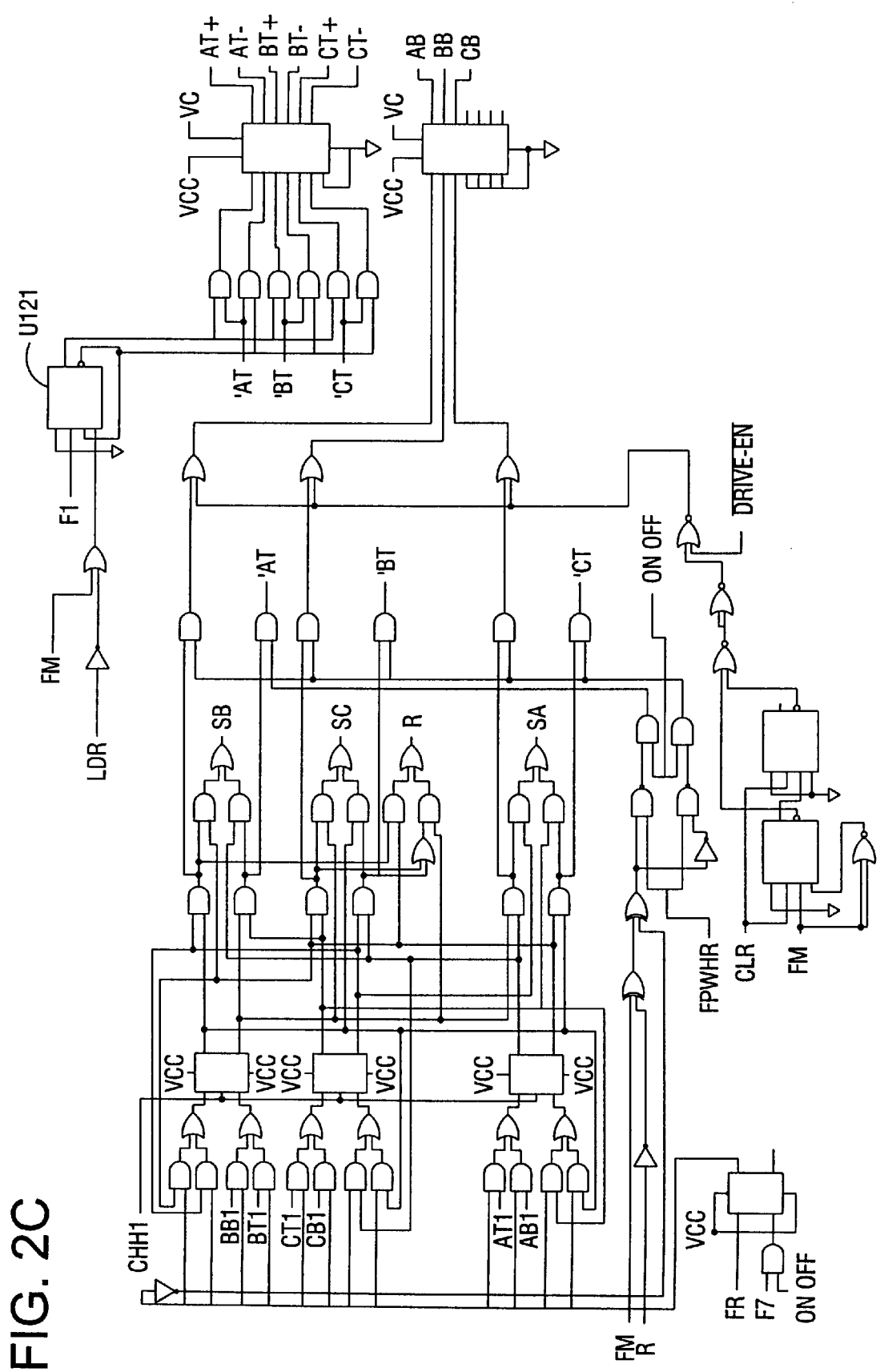
Figure 2D:
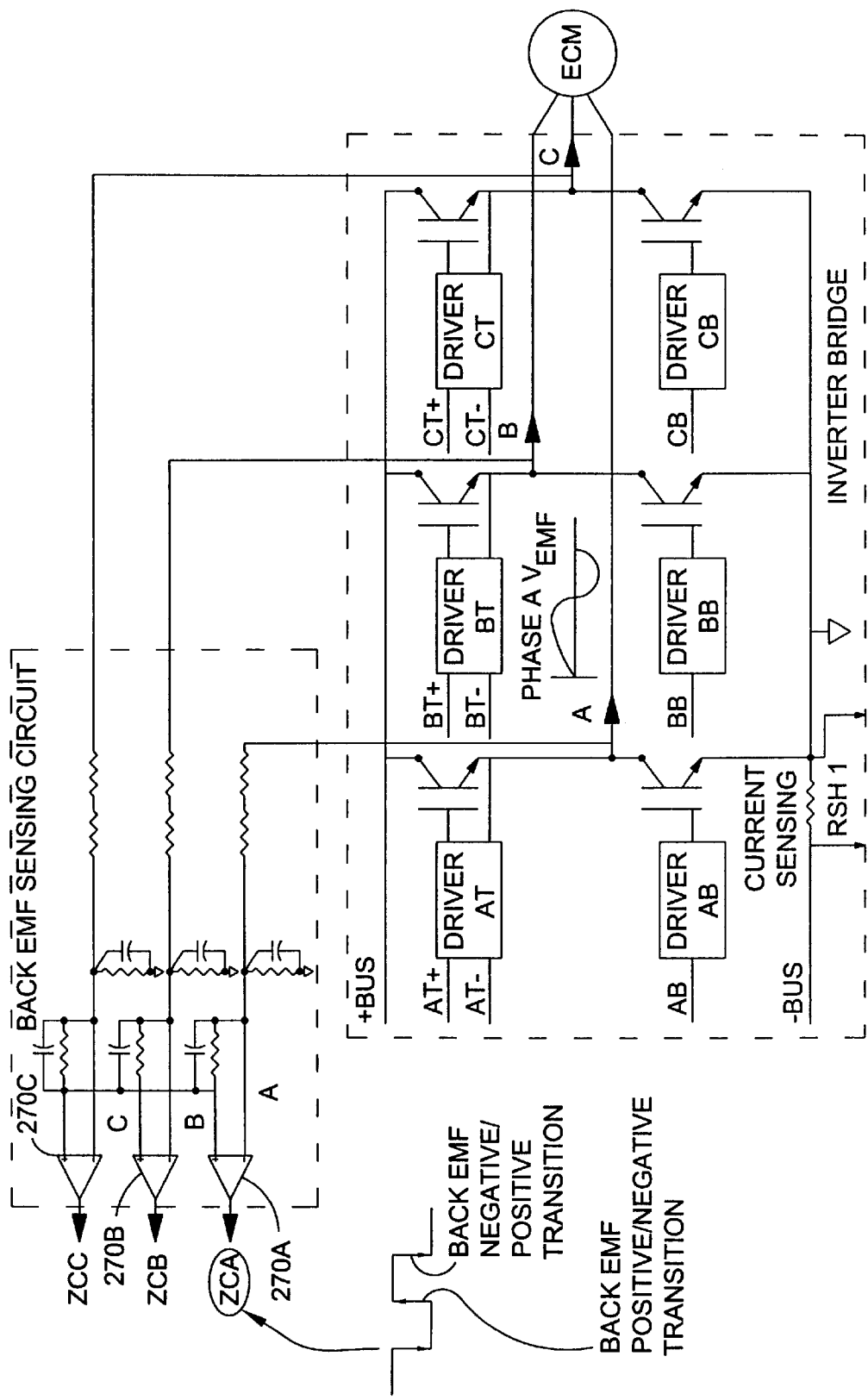
FIG. 2D is a schematic diagram of the inverter for use with the ASIC of the motor controller according to the invention.
Figure 2E:
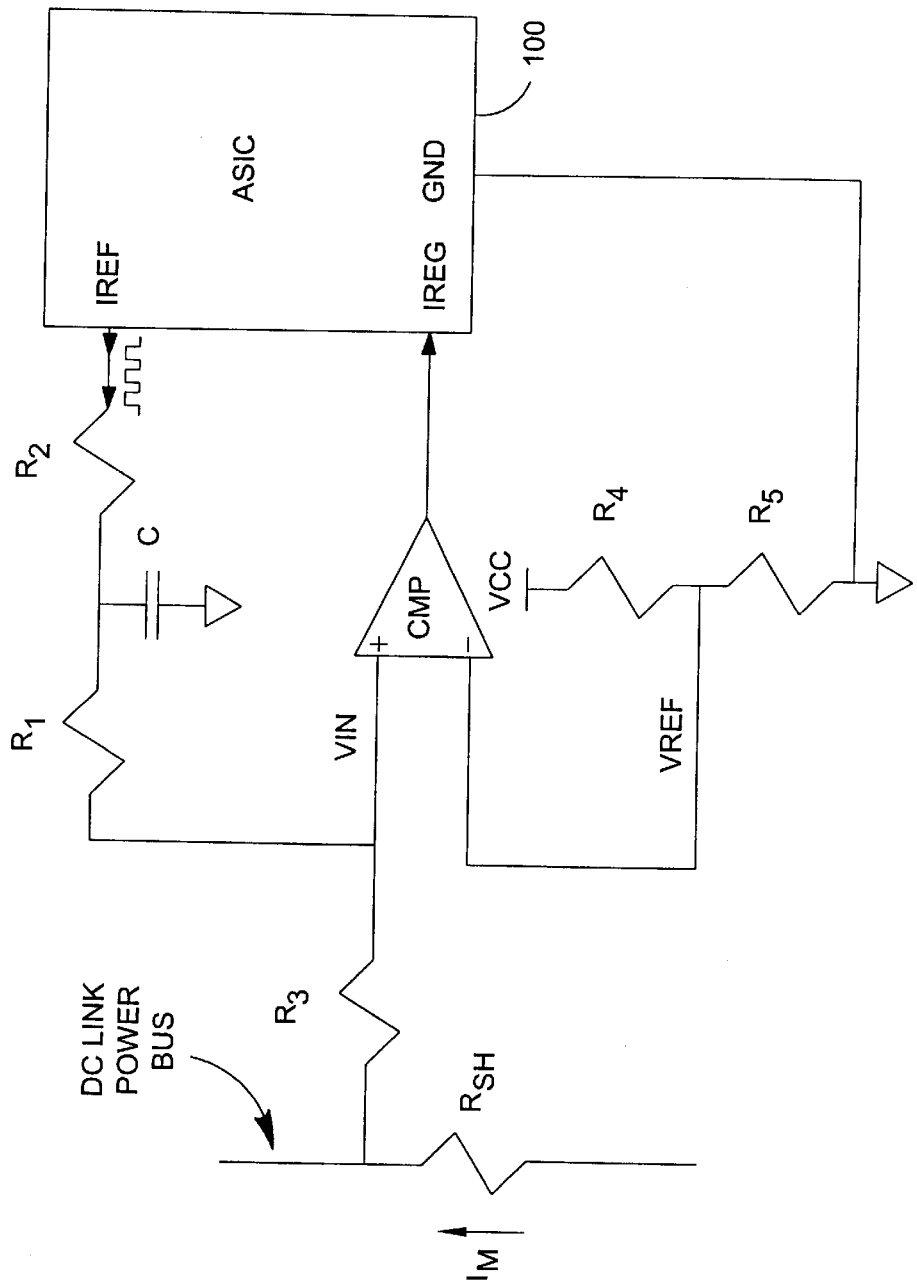
Figure 2G:
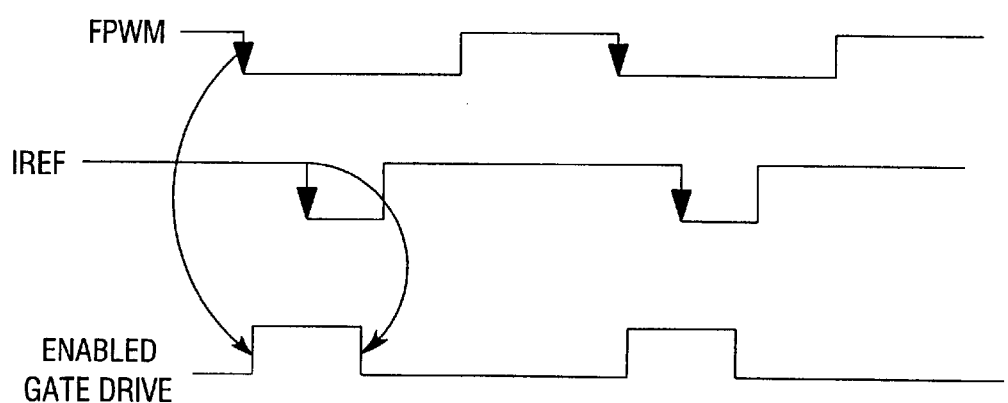
Figure 2H:
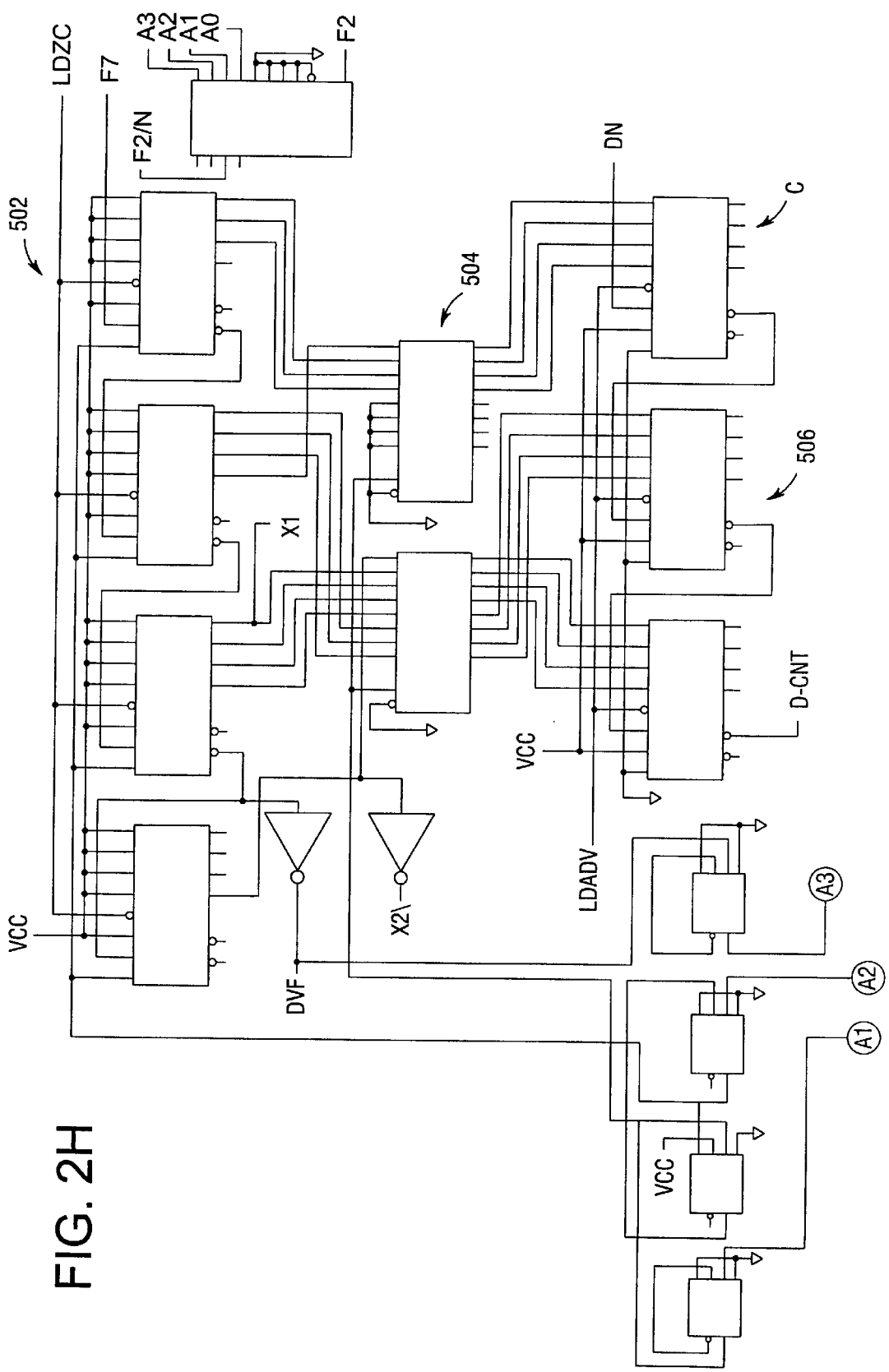
FIG. 2H is a schematic diagram of the zero crossing counters, advance and blanking counters and underspeed signal circuit.
Figure 2I:
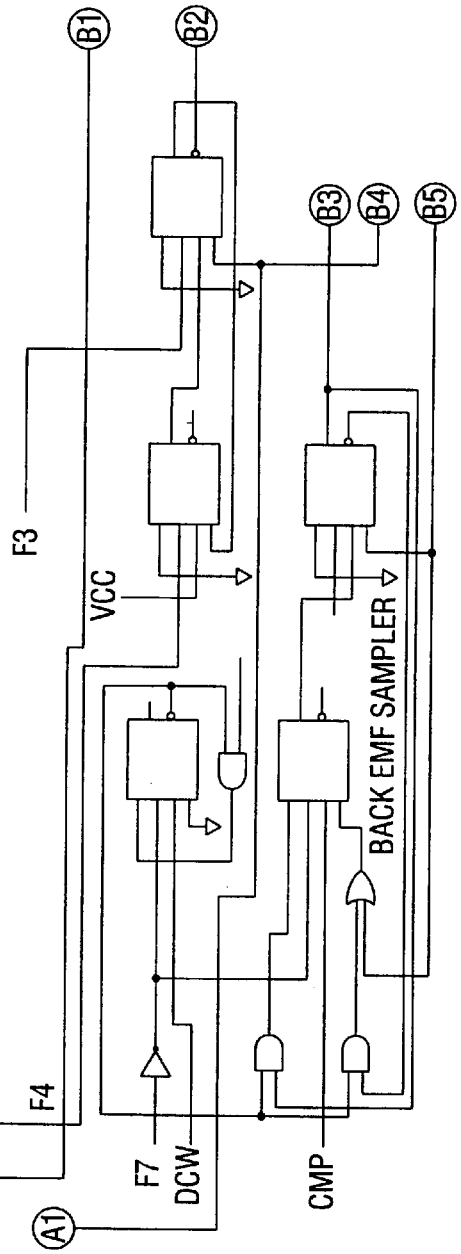
FIG. 2I is a schematic of the back emf sampler.

Rotor position sensing is based on electronic observation of the motor back emf phase voltage signals by a back emf sampler 206A (illustrated in FIG. 2I). Zero crossings of the waveforms of the phase voltages are detected by a zero crossing detector 206B at specific time intervals when the motor current has decayed to zero. The back emf sampler 206A indicates these zero current intervals to the zero crossing detector 206B. A state machine 206C, which controls the state of the inverter power switches, is bidirectional with a forward/reverse direction of rotation commands (FR) controlled via the shift register 204.

The ASIC 100 incorporates a new commutation averaging scheme as described below executed by a commutation instant estimator 206D. This permits better position tracking even with motors having asymmetrical back emf voltages. The state machine 206C is responsive to the time average of two consecutive zero crossing intervals as indicated by the zero crossing detector 206B via the estimator 206D.

ASIC COMMUTATION STRATEGY

The following describes the basis of the ASIC commutation strategy. The commutation state machine of FIG. 15 can be driven by two signals: (1) The overflow of the zero crossing (ZC) counters (OVF), and (2) the ZC signal which is generated by the back emf sampler circuit 206A and ZC detector 206B of FIG. 2A. Signal OVF (overflow) is used to start up the motor from stand still. At stand still there is no back emf, consequently, no information on rotor position signals ZCA, ZCB, or ZCC is available. The OVF signal steps the state machine so that motor windings are commutated at a constant speed and a given direction of rotation. The period of the OVF signal at the clock frequency of 3.58 MHZ is about 110 ms. This is equivalent to a rotational speed of 15 RPM for a 12 pole motor. Once the rotor starts rotating and back emf voltage is generated (signals ZCA, ZCB, or ZCC became available), the back emf sampler circuit 206A synchronize signals from the back emf voltage with the state machine. At this point, the OVF is substituted by the ZC signal which takes over the control of the state machine.

Figure 2J:
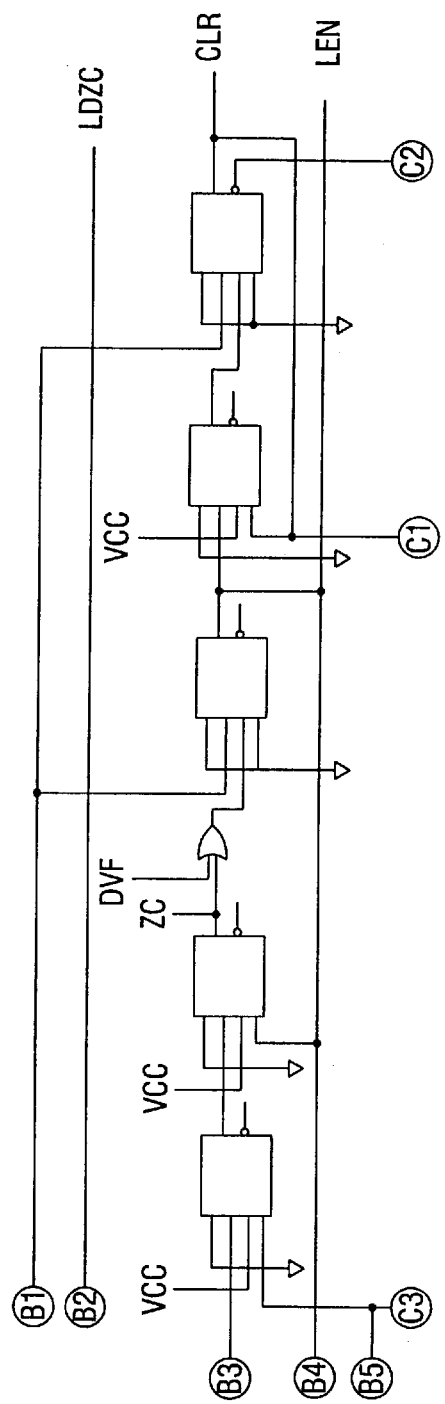
FIG. 2J is a schematic of the circuit for loading and synchronizing the zero crossing counters and the advance and blanking counters.

Referring to FIG. 2H, either the ZC or OVF signal enable the up counters 502 (COUNT UP) to count the number of cycles of signal F7. After two consecutive ZC or OVF signals, the count on these counters is stored in a register (latch) 504. After the count is stored, the up counters are cleared and ready to count another zero crossing interval. The count of two consecutive zero crossing intervals stored in register (latch) 504 is divided by two and then loaded into a down counter 506 (COUNT DOWN). This counter counts the number of events of signal DN starting from the count loaded into the down counter towards zero. The number of times the counter counts down depends of control signals A2, and A3 which are serially loaded into ASIC. After the number of down counts is completed, a commutation signal CMM1 as generated by the commutation circuit of FIG. 2K rotates the state machine which in turn commutates the motor phases. The angular distance from the zero crossing (or ZC signal) to the time the state machine is rotated is called here an advance angle. It can be modified by signals A1, A2, A3, and A4 which are serially loaded into the ASIC shift register. FIG. 2J illustrates one preferred embodiment for the circuit for loading and synchronizing the counters.

Figure 15:
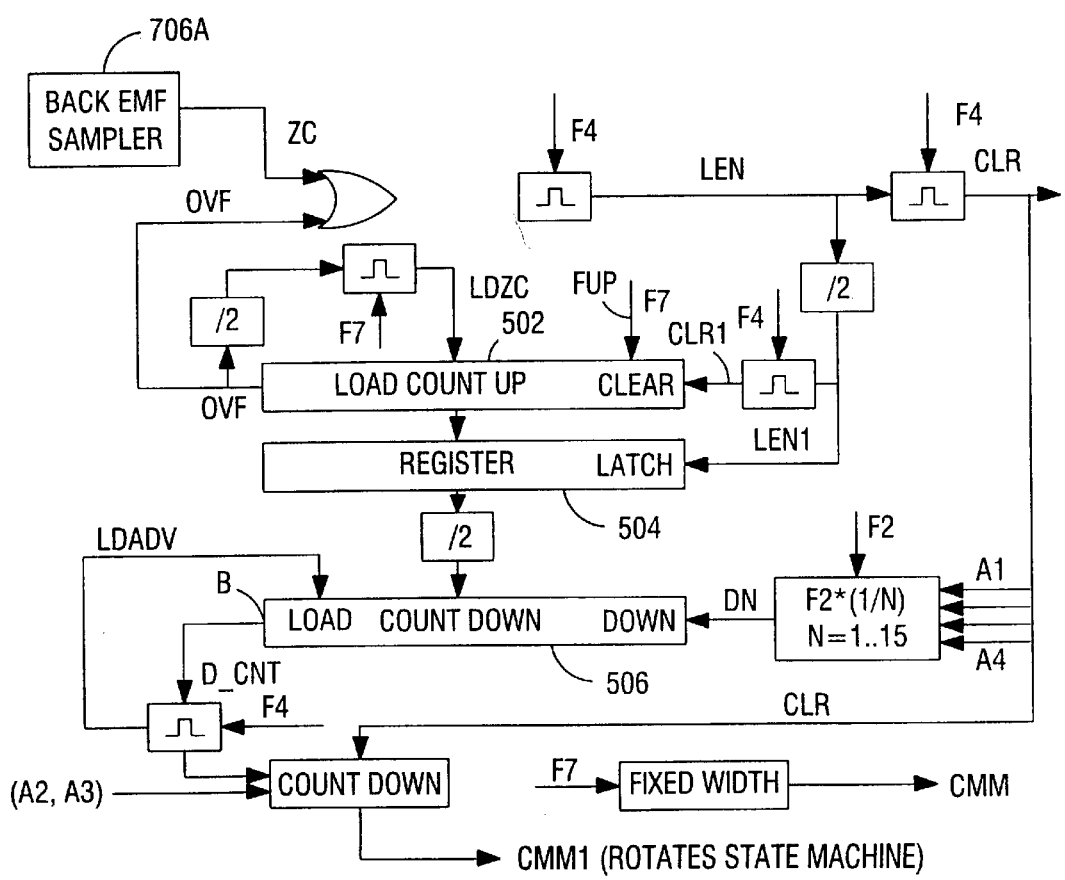
FIG. 15 illustrates the basic elements of the commutation strategy.

In FIG. 15, a CMM signal is also generated which is an output signal of fixed low level width. It occurs right after the occurrence of every zero crossing.

Referring again to FIG. 2A, the underspeed detector 212E is a digital circuit that monitors the motor speed based on two consecutive commutations. In the event that the motor speed falls below a preset speed, a signal that disables the gate drive signals is generated. This condition remains until the ASIC is commanded via serial interface to resume operation. The under speed detection circuit 212E is disabled during a predefined time interval while the motor is accelerating to its operating speed. This feature is useful to protect the motor under lock out conditions.

The microcontroller undercurrent watchdog 212D is a feature in which the ASIC monitors the microcomputer activity. In the event of inactivity in a predefined time interval, the microcomputer is reset by the ASIC.

In the control implementation, the microcontroller loads commands into the ASIC serial interface in a regular time intervals. The ASIC monitors the serial interface signals.

Referring to FIGS. 2B, 2C, 2D, 2H, 2I, 2J and 2K, a partial schematic of the bidirectional state machine 206C is illustrated. In particular, the bidirectional logic circuit consists of a state machine with six unique states to control the switches 104 of a 3-phase inverter bridge. Each state of the state machine is associated with the turning on of two inverter switches: one upper and one lower of different inverter phases. The state machine is designed to be bi-directional (forward/reverse) commanded by a signal which is loaded serially into the ASIC shift registers.

The following Table 2 illustrates the six states of the state machine according to the invention and the corresponding state of each port of each IGBT switch:

TABLE 2

| STATE | AB | BB | CB | AT+ | AT− | BT+ | BT− | CT+ | CT− |
|---|---|---|---|---|---|---|---|---|---|
| 1 | ON | — | — | — | — | — | — | ON | ON |
| 3 | — | ON | — | — | — | — | — | ON | ON |
| 2 | — | ON | — | ON | ON | — | — | — | — |
| 6 | — | — | ON | ON | ON | — | — | — | — |
| 4 | — | — | ON | — | — | ON | ON | — | — |
| 5 | ON | — | — | — | — | ON | ON | — | — |

Table 2 shows the states of the state machine and the corresponding inverter switches activated (ON or closed switch). Non-activated inverter switches (OFF or open switch) are shown as dashed line. Lower inverter switches are controlled with signals AB, BB, and CB. Upper inverter switches are controlled by signals AT+, AT−, BT+, BT−, CT+, CT− for motor phases A, B, and C, respectively. For example, when state machine is in state 1, lower switch of phase A and upper switch of phase C are commanded ON.

The following Table 3 illustrates the switch labeling, phase sensing and zero crossing transitions for each state:

TABLE 3

| | FR = 0 | | | | | FR = 1 | | | |
|---|---|---|---|---|---|---|---|---|---|
| State | Lower Switch | Upper Switch | Phase sense | ZC Trans | State | Lower Switch | Upper Switch | Phase sense | ZC Trans |
| 1 | AB | CT | SB | ↑ | 1 | AB | CT | SB | ↓ |
| 3 | BB | CT | SA | ↓ | 5 | AB | BT | SC | ↑ |
| 2 | BB | AT | SC | ↑ | 4 | CB | BT | SA | ↓ |
| 6 | CB | AT | SB | ↓ | 6 | CB | AT | SB | ↑ |
| 4 | CB | BT | SA | ↑ | 2 | BB | AT | SC | ↓ |
| 5 | AB | BT | SC | ↓ | 3 | BB | CT | SA | ↑ |

Figure 5:
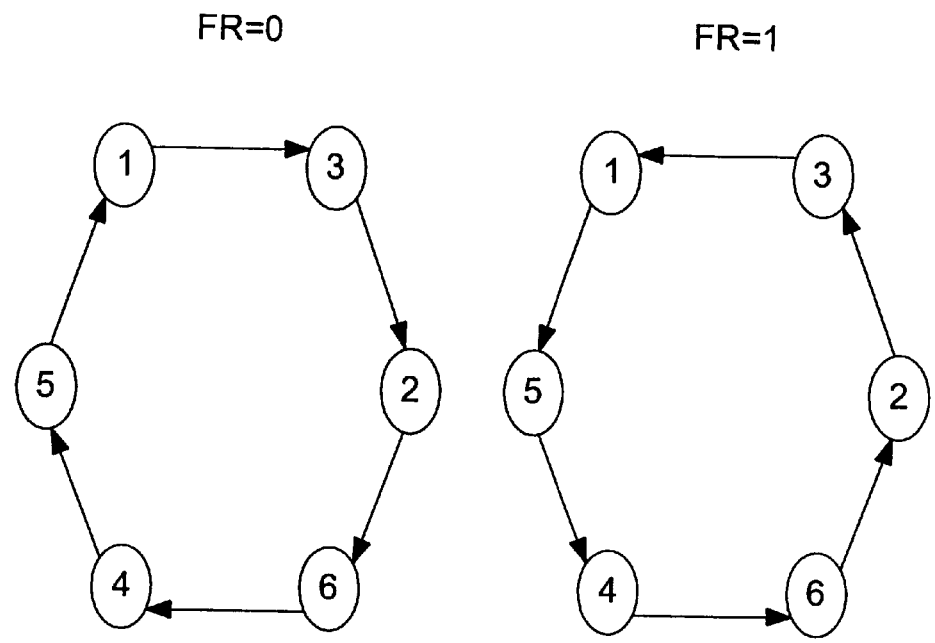
FIG. 5 illustrates the state sequence of the bidirectional state machine 206C of the ASIC 100 for forward rotation (FR=0) and for reverse rotation (FR=1), according to the invention.

Table 3 shows key elements used for rotor position sensing for direction of rotation indicated by FR=0 and FR=1: the states of the state machine, the inverter switches being activated, the phase of the motor back emf voltage being observed, and an indication on how the back emf voltage approaches zero voltage. For example, for direction of rotation indicated by FR=0, when state machine is in state 1, lower switch of phase A and upper switch of phase C are commanded "ON," the motor back emf of phase B is being observed (sensed), and it is transitioning from positive to negative. FIG. 2D illustrates the waveform for ZCA and indicates that the up arrow shows positive to negative transitions and the down arrow shows negative to positive transitions. FIG. 5 shows the sequence of the state for forward (FR=0) and reverse (FR=1) rotation. FIG. 2C illustrates one preferred implementation of FIG. 5 although 8 states are available, only 6 states are used.

CURRENT REGULATION

The circuit of FIG. 2E is used to regulate the motor phase current ($I_M$). This circuit uses an external comparator (CMP) and other external components. The motor current ($I_M$) is sensed using a shunt resistor Rsh in series with the DC link power bus feeding the inverter (see FIG. 2D). The ASIC provides a pulse width modulated signal IREF as a current reference indicating the peak of the desired motor current. This signal is digital level reference of constant frequency and variable duty cycle with a resolution of 1024 current steps. Resistors R1, R2, and capacitor C transform this digital level reference signal into an analog level reference that is compared against an analog voltage across Rsh produced by the motor current circulating through shunt resistor Rsh to produce $V_{in}$. Resistor R3 is used for current scaling purposes. Resistors R4 and R5 provide a voltage reference $V_{REF}$ for the comparator CMP so that a low level of current regulation can be set.

The output (IREG) of comparator CMP is input to the ASIC 100. This signal commands the ASIC to turn off the inverter switch involved in current regulation (note: on a 3-phase ECM machine only two inverter switches are enabled at any given time and one of these switches is involved in current regulation as commanded by the current regulator block). Each switch remains off until the beginning of the following PWM cycle at which the switch is turned on again.

The IREF signal is obtained using a 10-bit digital comparator shown in FIG. 2B as a bank of 10 exclusive OR gates indicated by arrow DC. The duty cycle of this signal is determined by the comparison between a digital 10-bit number loaded into the ASIC serial shift registers and 10 frequencies from an output of binary counters. (See FIG. 2F).

Figure 16:
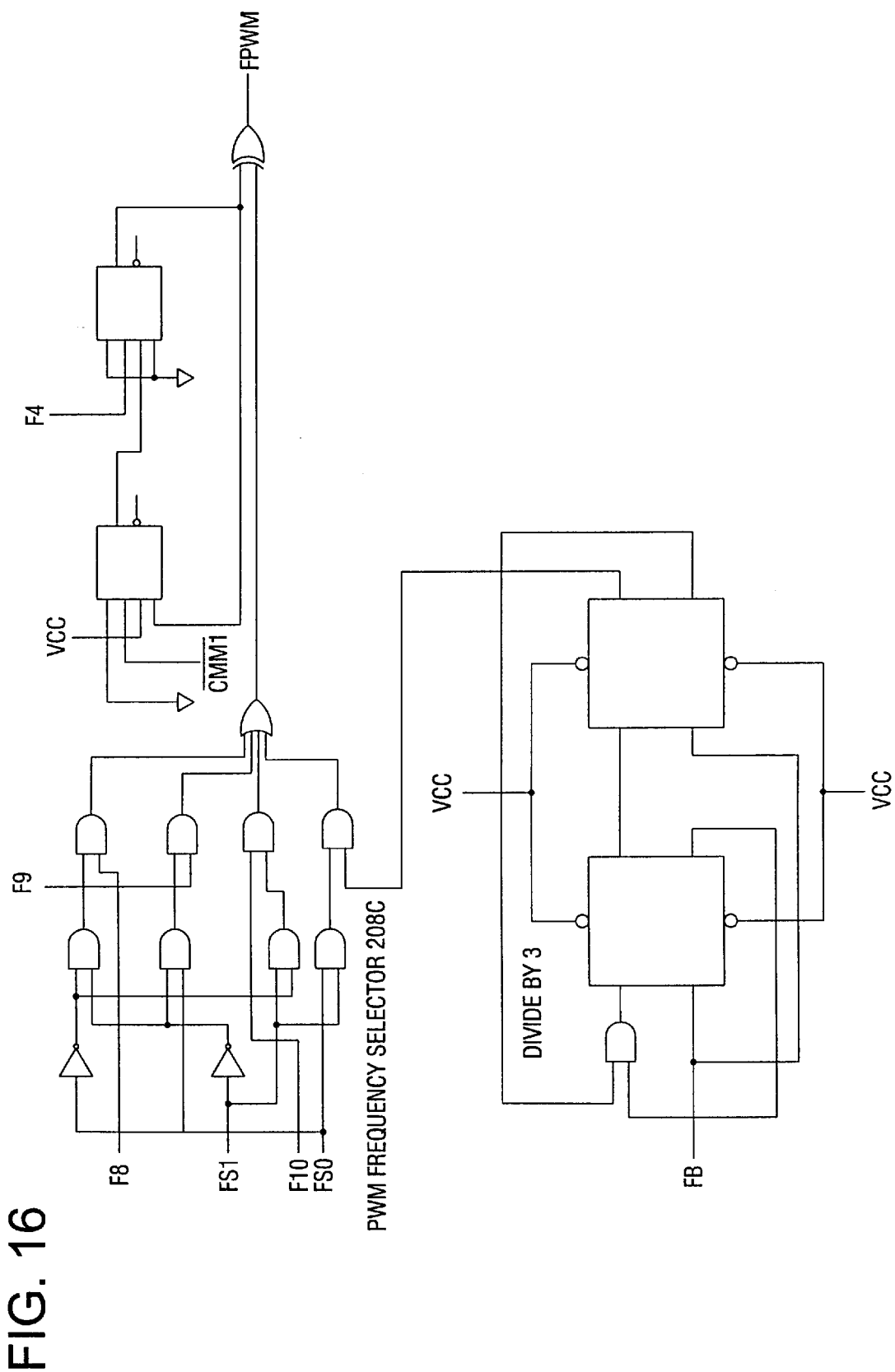
FIG. 16 is a schematic of the PWM frequency selector 208.

The PWM Frequency Selector block 208C of FIGS. 2A and 16 selects the frequency for pulse width modulation. Two bits serially loaded into the ASIC shift register (F0 and F1) are used to select one of 4 available PWM frequencies.

FIGS. 2F and 2G illustrate some of the key waveforms associated with the current regulation showing the pulse width modulating cycles for the modulating frequency (fPWM), the corresponding digital and analog current reference (IREF) signal, the corresponding output (IREG) of the comparator CMP and the corresponding gate drive enabling signal.

Figure 10:
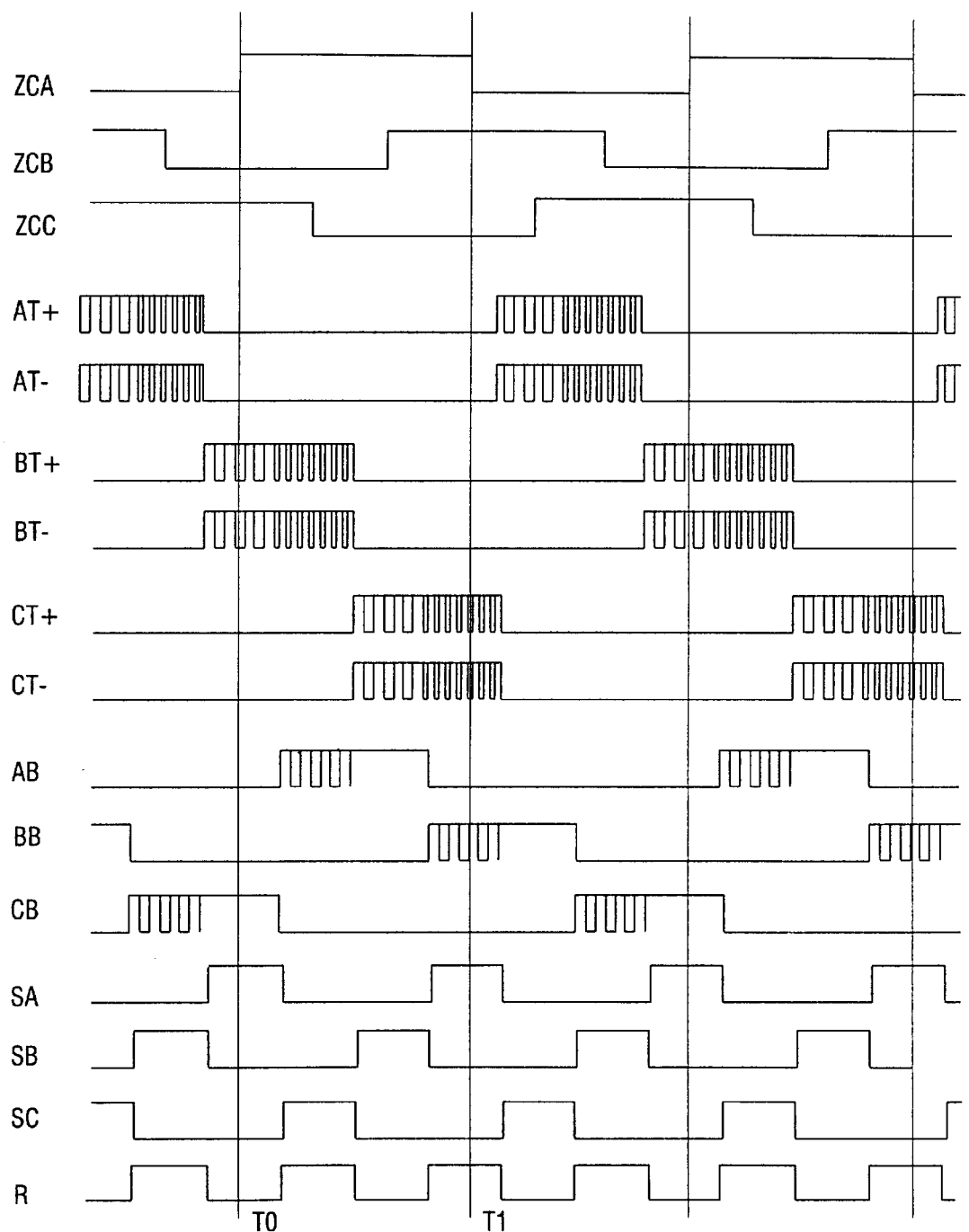
FIG. 10 illustrates one example of current regulation of the ASIC waveforms according to the invention.

FIG. 10 shows idealized key signals associated with current regulation. The inverter switch involved in current regulation is shown as having additional modulation. At time t0, the upper switch (BT, see FIG. 2D) of phase B and the lower switch (CB) of phase C are enabled, the lower switch (CB) is in full conduction while the upper switch (BT) is pulse width modulating. At time t1, the upper switch of phase C is in full conduction while the lower switch of phase B is pulse width modulating. When regulating current, only one switch is pulse width modulating. This helps to reduce power losses due to switching events.

Note that only one signal is needed to control the inverter lower switches while two signals are needed to control the upper ones (see FIG. 2D). Further, the ASIC signals to control the upper switches which drive an isolating transformer are modulated by a high frequency carrier at about 895 kHz. The upper switch is commanded ON when the high frequency modulating frequency is present, and it is pulse width modulating when a lower modulating frequency (selected by the PWM frequency selector) is present in addition to the high modulating frequency.

Figure 17:
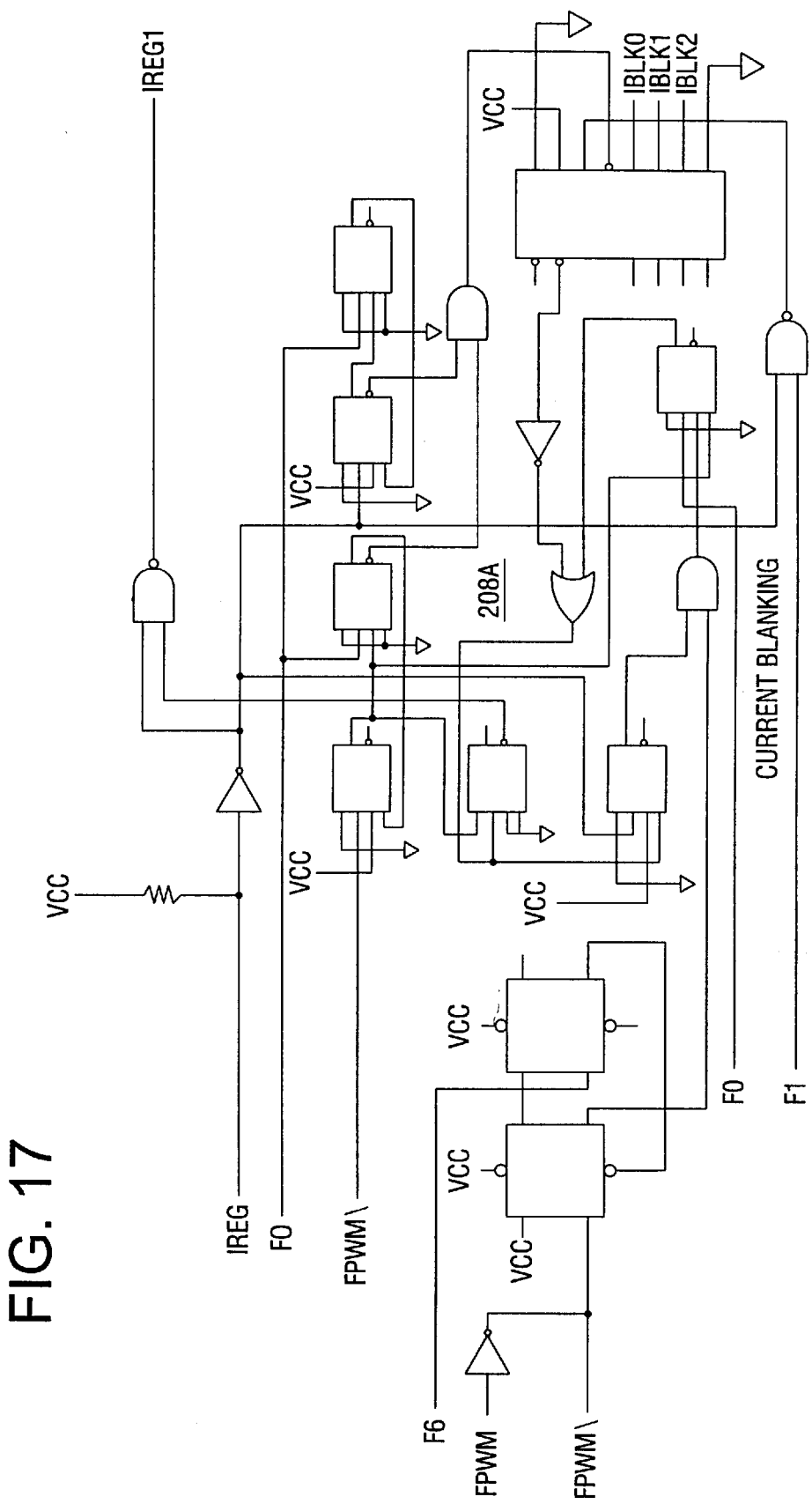
FIG. 17 is a schematic of the current blanking 208A.
Figure 18:
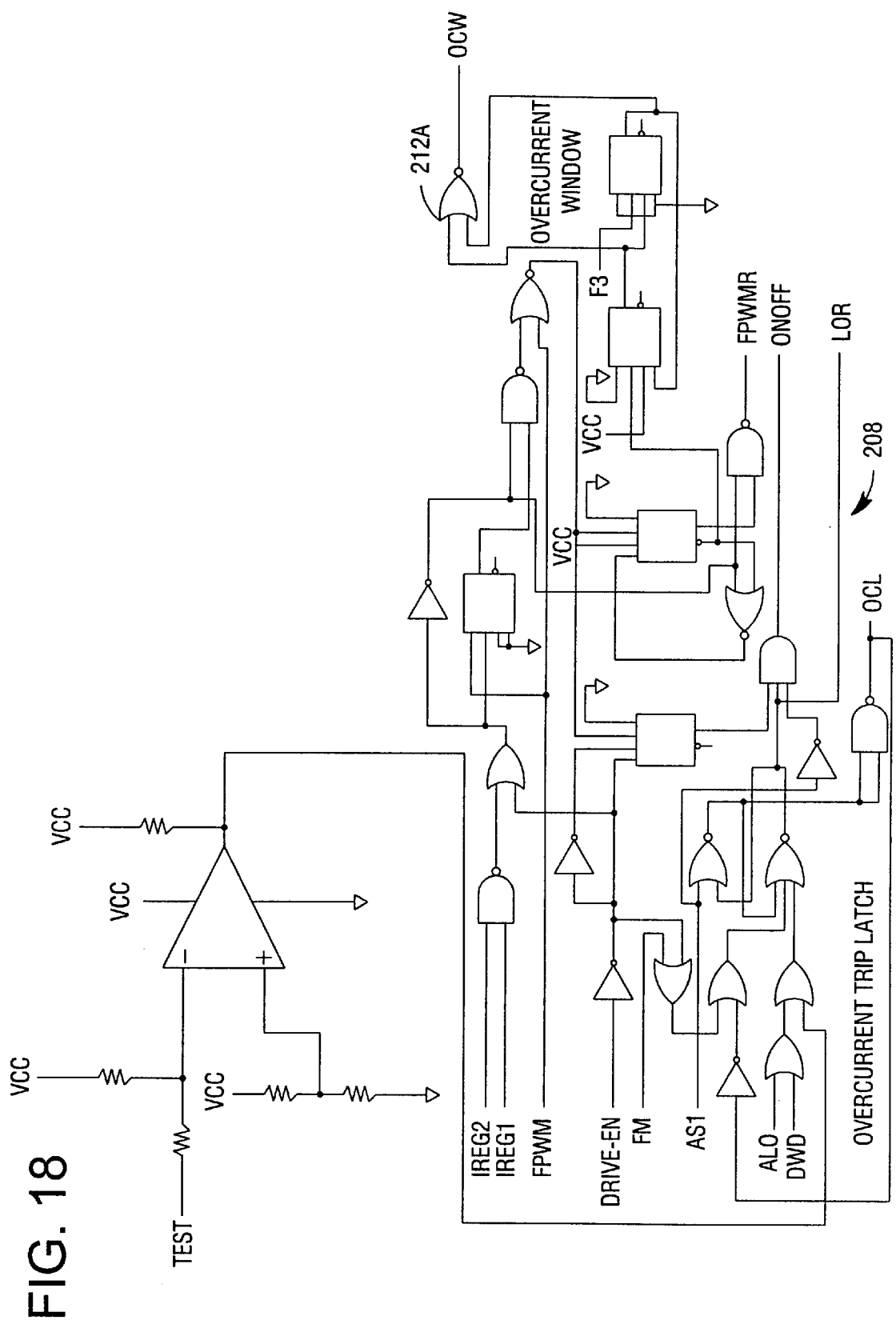
FIG. 18 is a schematic of the current regulator 208 and overcurrent comparator 212A.

Referring again to FIG. 2A, ASIC 100, the high resolution current regulator 208 (see FIG. 17) has a pulse to pulse current regulation scheme and a current blanking control 208A (FIG. 17) controlled via the shift register 204 for minimizing noise. Motor current amplitude is controlled by the current regulator 208 by pulse width modulating (PWM) the motor phase current using a selectable PWM frequency as indicated by the PWM frequency selector 208C which is controlled via the shift register 204. A current reference (IREF) 208D defined by the shift register 204 provides a reference to the current regulator 208.

The pulse to pulse current modulation scheme operates as follows: the desired motor current level is set by a duty cycle of signal IREF. A pulse width modulating (PWM) frequency is selected in the ASIC, and the motor current is pulsed at a rate of the PWM frequency. At the beginning of a PWM cycle, the motor current starts to build up towards the commanded level indicated by IREF. As soon as the motor current reaches its commanded level, one of the inverter switches is turned OFF by the ASIC in response to a transition from high to low of the IREG signal. The motor current starts to decay until the beginning of next PWM modulating cycle in which the motor current builds up again completing one PWM cycle. Motor current is regulated in a cycle by cycle basis or pulse to pulse basis.

An array of high voltage gate drives 210 provide three high voltage control signals (AB, BB and CB) which directly drive the three lower devices of the 6-switch inverter 104. In addition, the array of drives 210 provides six high voltage signals (AT+/−, BT+/−, CT+/−) which drive three corresponding isolating transformers which in turn drive the three corresponding upper devices of the 6-switch inverter 104.

Preferably, the ASIC 100 includes protection circuits which limit motor operation. For example, an overcurrent comparator 212A as described below may be used to trip an overcurrent latch 212B which controls operation of the current regulator 208 to limit current. In addition, the ASIC 100 may include an undervoltage detector 212C which monitors VDD and inhibits operation of the current regulator 208 for certain undervoltage conditions. In addition, the ASIC 100 may include a microcontroller watchdog circuit 212D including a power on reset for resetting the microcontroller in low voltage conditions, and an underspeed circuit 212E for inhibiting low speed operation or a stall condition. These protection circuits contribute to the high level of integration according to the invention.

The ASIC 100 may also include a motor dynamic braking circuit 214 controlled via the shift register 204. The braking circuit as described below is designed to quickly reduce the speed of rotation of the load (blower 102B in FIG. 1) by dissipating its rotating energy in the motor winding resistance and in the inverter power switches. This feature has particular applications in areas requiring blower wheel balancing by speeding up the balancing time.

Referring generally to FIGS. 2B and 2C, a schematic of the circuitry of the ASIC 100 which develops the high voltage (0–15 volts) signals for controlling the IGBTs is illustrated. In particular, the ASIC digital circuitry operates at the low voltages supplied by an external source. Nine signals control the six inverter power switches. These nine control signals are level shifted from a low voltage (e.g., 5 volts) to a high voltage level (e.g., up to 18 volts or more). The high voltage level is required to control the sequential power switching of switches such as IGBTs.

Preferably, the present invention may employ the fundamentals of a motor controller device whose methods of operation are disclosed in U.S. Pat. No. 5,592,058 issued Jan. 7, 1997 entitled "Control System and Methods for a Multiparameter Electronically Commutated Motor" by W. Archer R. Becerra, B. Beifus, and M. Brattoli, the disclosure of which is incorporated by reference herein in its entirety.

ROTOR POSITION SENSING TRACKING BY AVERAGING TWO CONSECUTIVE ZERO CROSSING INTERVALS

In the ASIC 100 according to the invention, the commutation instant is estimated based on the length of the previous interval between two consecutive zero crossings (two zero crossing intervals). As shown in FIG. 2A, ASIC 100 includes a back emf sensing circuit such as a sampling circuit 206A connected to the motor stator windings and providing information on the zero crossings of the back emf voltage waveforms. The back emf sampling circuit 206A also includes a zero crossing detector 206B which provides a zero crossing signal indicative of zero crossings of the back emf signal. The ASIC 100 also includes a circuit 206D (see FIGS. 2A and 15) for estimating the commutation instant based on the length of the previous interval between two consecutive zero crossings.

In a preferred 120 degree conduction interval scheme of the invention, motor phases are commutated not at the zero crossing of the back emf but at an angular distance from the zero crossings. This angular distance is a portion of the interval between two consecutive zero crossings. In the commutation scheme of the prior art, the angular distance is estimated based on one commutation interval. This scheme works well in the presence of symmetric back emf waveforms in which the distance from zero crossings is identical in steady state conditions; however, in presence of a highly asymmetric back emf, the scheme is less effective and may lose synchronism at high levels of asymmetry. In the new commutation scheme according to the invention as shown in FIGS. 6–9, the commutation instant indicated by the negative going transition of signal $CMM_1$ of FIGS. 8 and 9 or the angular distance is estimated based on the average of two consecutive zero crossings (ZC). Theoretical calculations and experimental verifications have shown the advantage of the new scheme (i.e., for an extreme asymmetry of the zero crossings of 75%–25%, the advance angle at 7.5 deg. setting is 10.63 deg. with the prior art scheme whereas it is 9.06 deg. with the new scheme of the invention).

There are at least two major advantages of the new approach: (1) extending the motor safe operating area without the loss of synchronism at high speed and high torque which results in extending the ability to drive motors with larger degrees of asymmetries; and (2) better performance at start up because the averaging approach helps to filter noise at start up where the motor back emf signals are of small magnitude and the signal to noise ratio is low.

The zero crossing interval is implemented by a step up and a step down digital binary counters and a counter control logic as indicated in the upper section of FIG. 2H as indicated by arrow C. Up counters are allowed to count for two consecutive zero crossings intervals. The average zero crossing interval is implemented by dividing by two the content of the two zero crossings counter interval.

Figure 6:
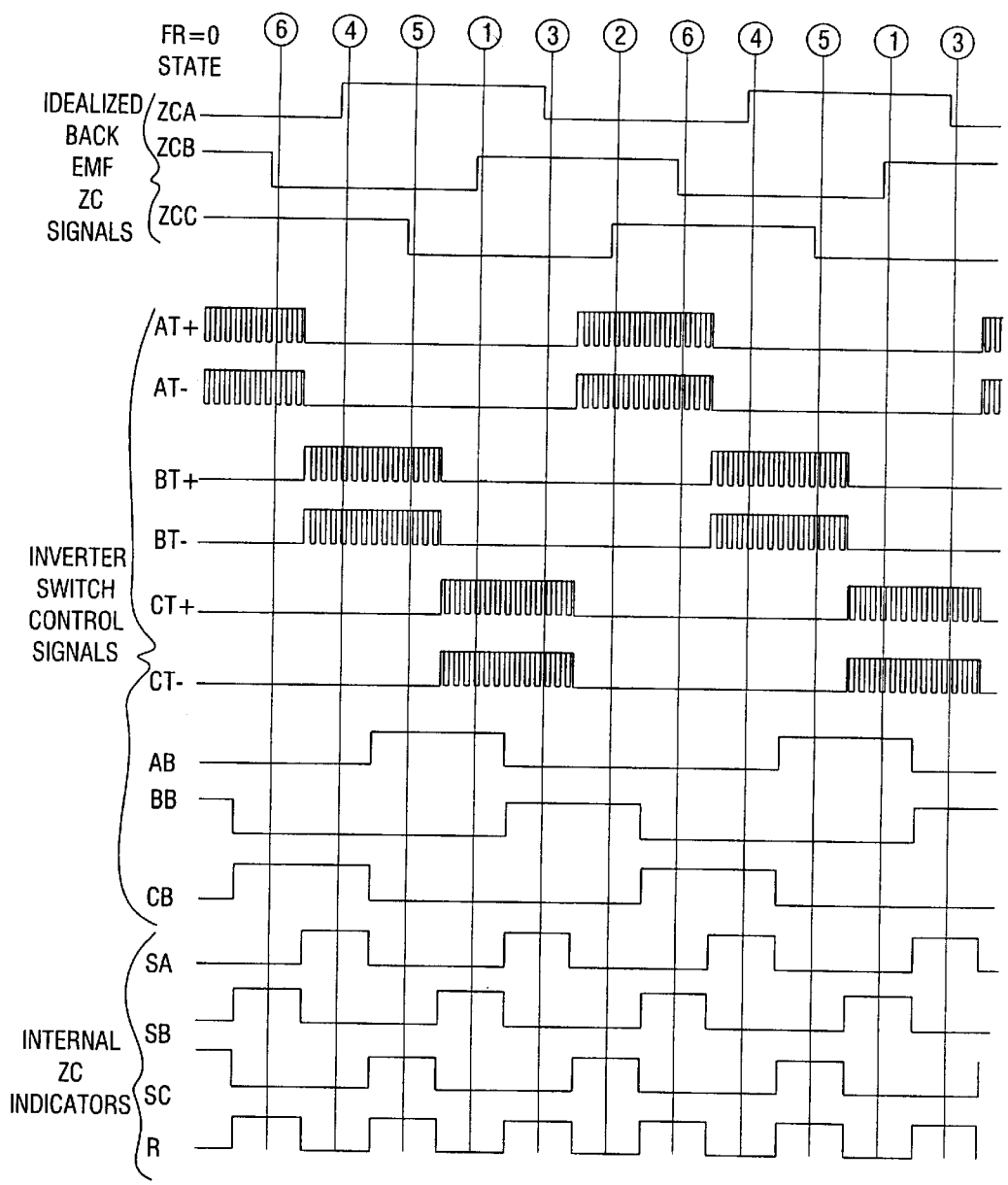
FIG. 6 illustrates the ASIC waveforms for forward rotation (FR=0) according to the invention.
Figure 7:
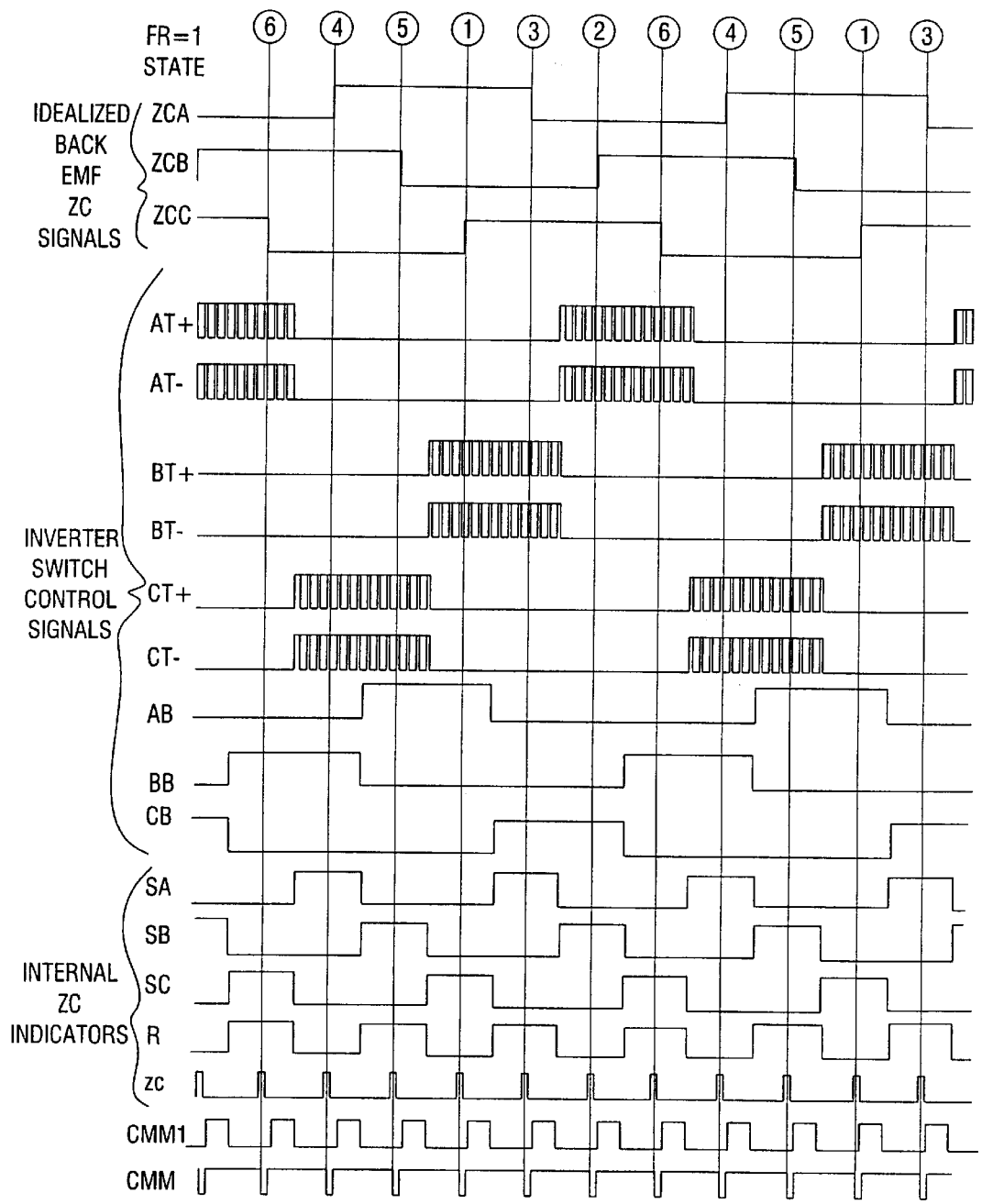
FIG. 7 illustrates the ASIC waveforms for reverse rotation (FR=1) according to the invention.

FIGS. 6 and 7 show key signals of the ASIC 100 inverter switches and corresponding back emf signals being observed for each direction of rotation. The top of each figure illustrates ideal signals for the back emf zero crossings (ZCA, ZCB, ZCC) for each of the three motor phases. These signals are obtained by the three external comparators 270A, 270B, 270C indicated in FIG. 2D. Signals AT+, AT−, BT+, BT−, CT+, CT−, AB, BB, and CB are signals controlling each of the six inverter switches. Note that signals AT+, AT−, BT+, BT− and CT+, CT− for the upper inverter switches are modulated with a high frequency. Each pair of these signals drive an isolating transformer which control each inverter upper switch.

Signals SA, SB, and SC are ASIC internal signals, which indicate that zero crossings of the back emf waveform for motor phases A, B and C are expected (when level is high). Signal R is an ASIC internal signal used for the back emf sampler 206A of FIG. 2A. Each state of this signal indicates that a new zero crossing is about to occur. FIG. 7 shows a pulse at every occurrence of a zero crossing of the back emf waveforms. Commutation signal CMM1 in this figure shows the instant (negative going transition) at which the state machine is rotated (state is advanced). Signal CMM is an ASIC output signal which is used by the microcontroller to determine the speed at which the motor is rotating. Also, this signal is available to the user via an isolated user interface.

Figure 8:
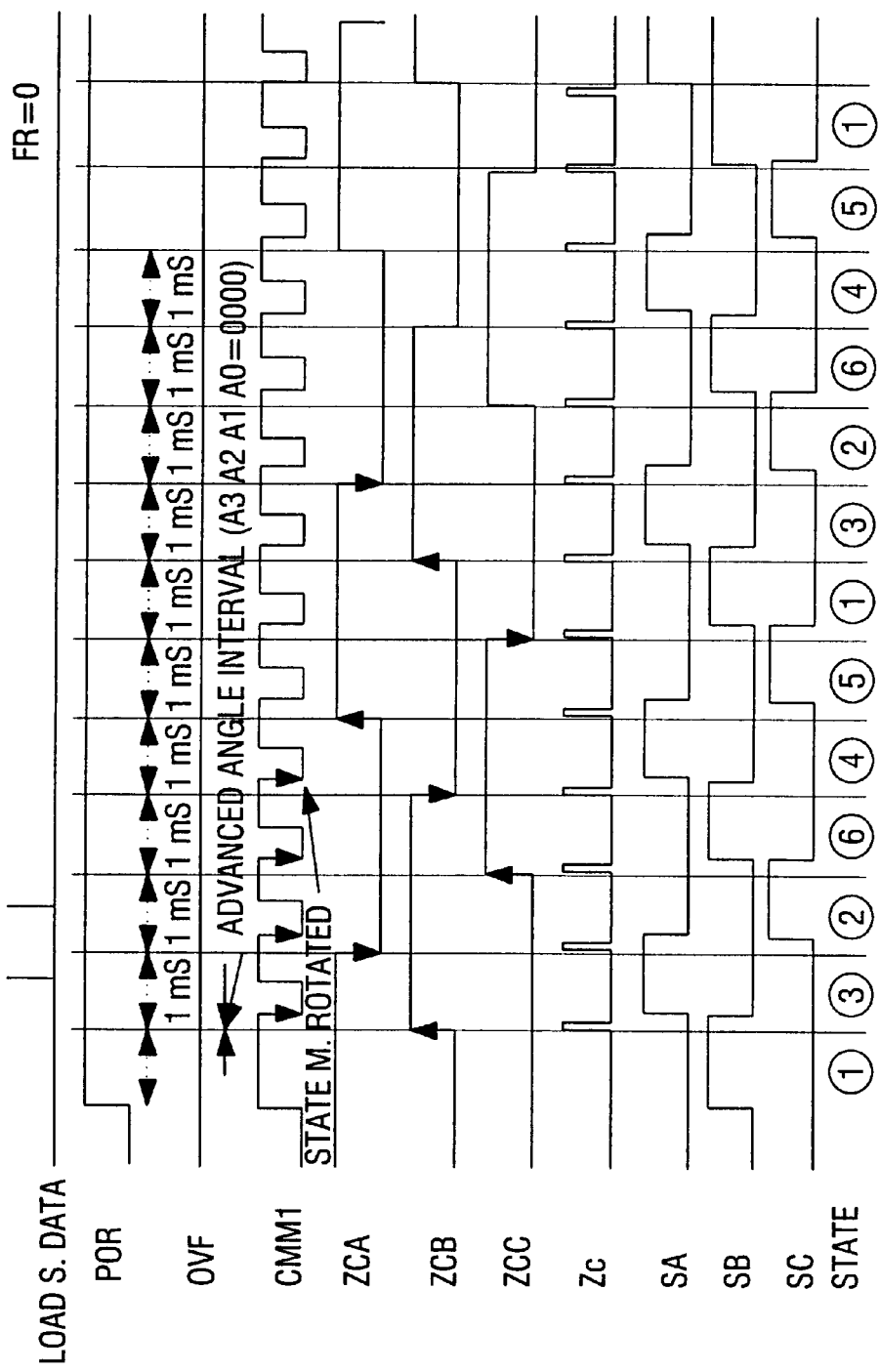
FIG. 8 illustrates the state machine waveforms for states 1–6 for forward rotation (FR=0) according to the invention.
Figure 9:
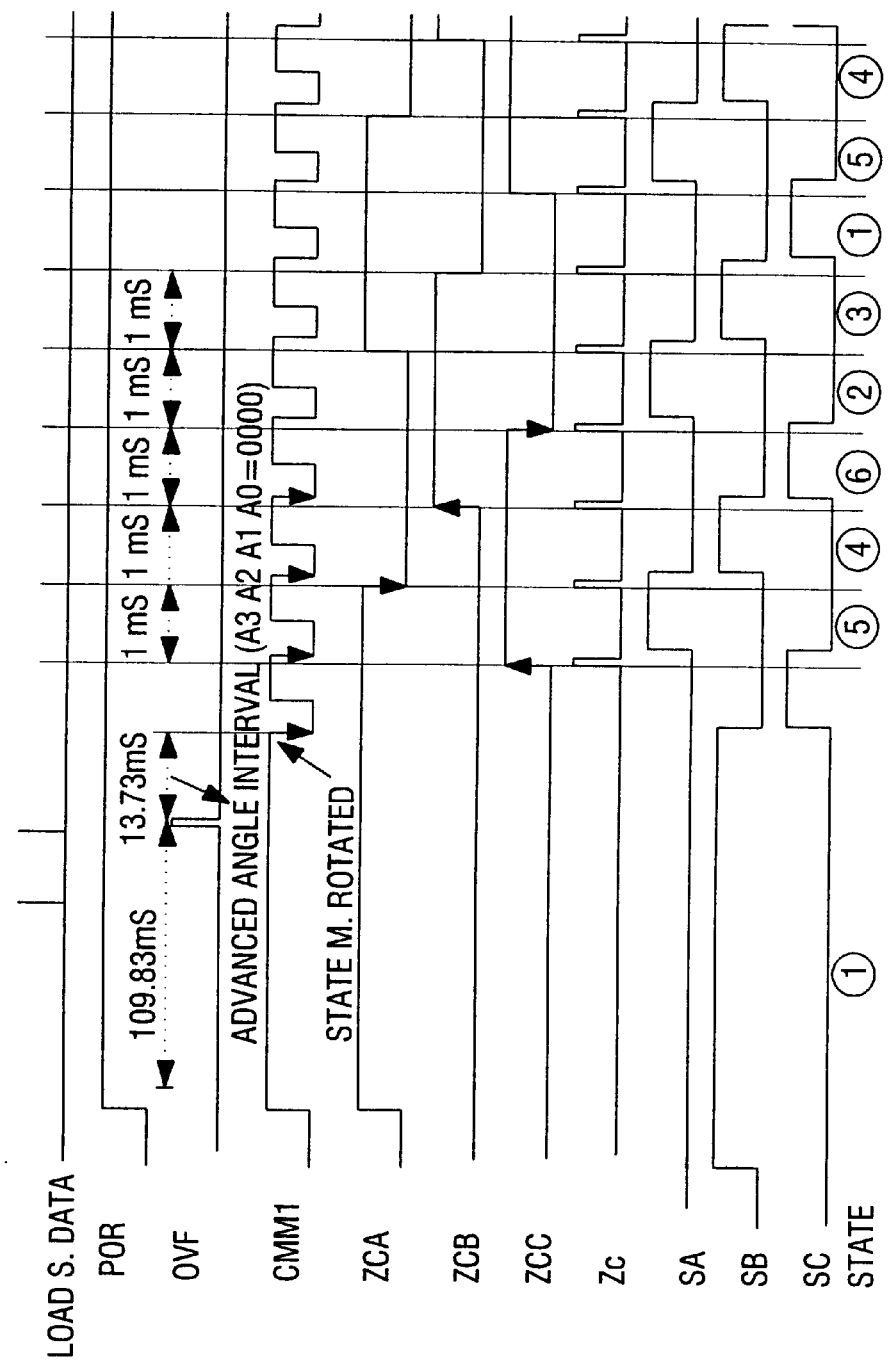
FIG. 9 illustrates the state machine waveforms for states 1–6 for reverse rotation (FR=1) according to the invention.

FIGS. 8 and 9 describe a method to accelerate the testing of ASICs. A set of stimuli signals is coordinated with the time the device is powered facilitating the synchronization of the device to external stimuli in both directions of rotation. Serial data is loaded twice (Load s. data) after a power on reset (POR) to initialize and enable the ASIC. Signals ZCA, ZCB, and ZCC are artificial simulations of the back-emf. Signal OVF is the overflow signal mentioned above as part of the commutation strategy to force rotation at slow speed.

FIG. 10 shows key signals controlling the inverter power devices when motor phase current is being regulated. The regulation scheme is pulse to pulse regulation with a selectable modulation frequency. Only one of the six-inverter power devices is pulse width modulated at any given time. FIG. 10 shows in an idealistic manner which power switch is being pulse width modulated (first half of a conduction interval or 60 electrical degrees).

Current blanking is a very useful feature of the current regulator which enhances its ability to regulate low levels of current. The blanking is a time interval after the beginning of the pulse width modulating cycle in which the overcurrent information of the IREG signals is ignored. This approach helps to eliminate the effect of the inverter switch diode recovery current effect in regulating low levels of current. The blanking time interval is selected by 3 signals (IBLK) loaded serially into the ASIC shift registers (see FIG. 2A and Table 1).

Figure 2K:
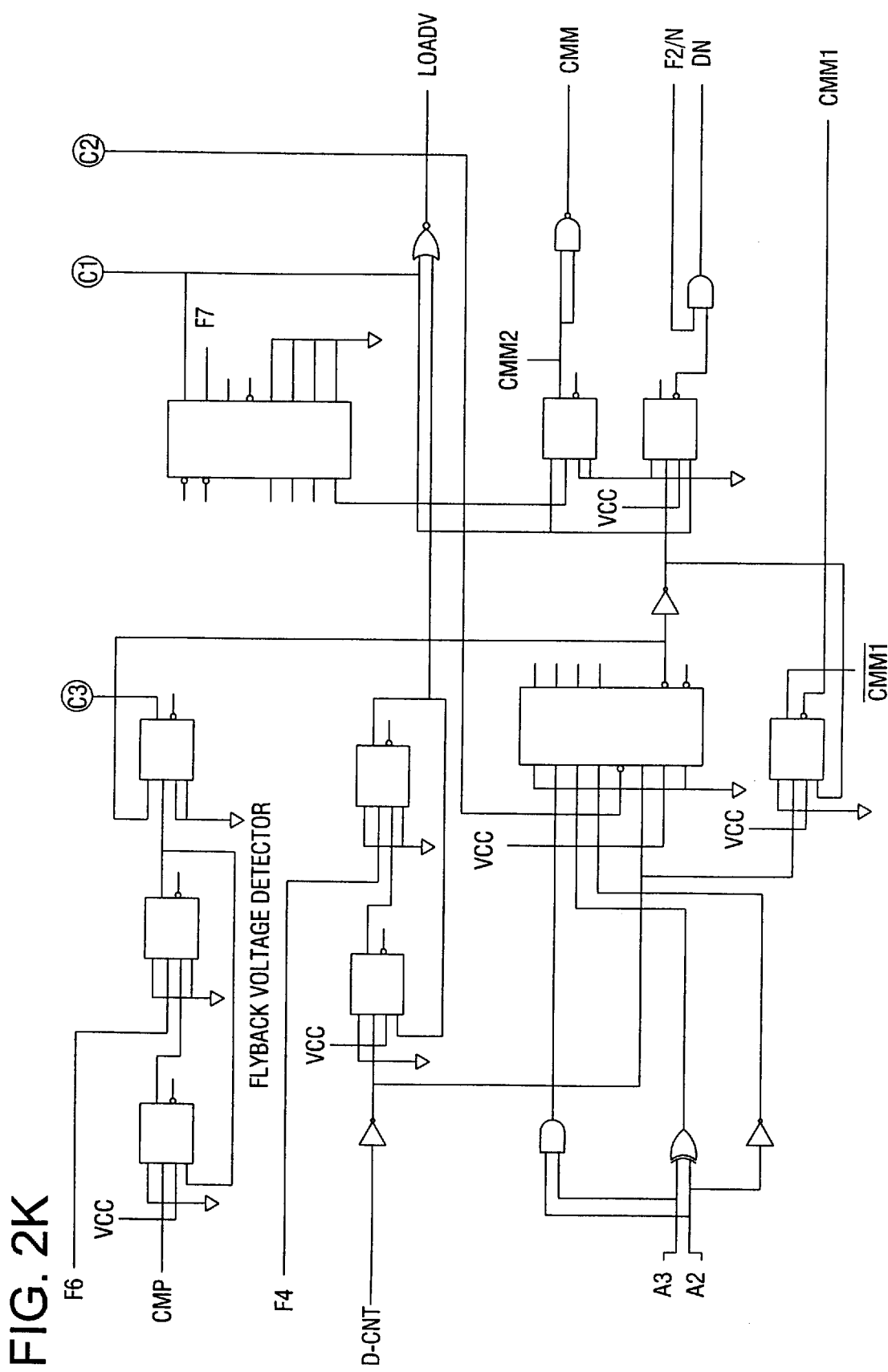
FIG. 2K is a schematic of the adaptive position blanking and commutation signal (CMM1) circuit.

In addition to current blanking, it is also contemplated that the ASIC 100 according to the invention may include an optional circuit as shown in FIG. 2K for providing adaptive position blanking. This position blanking circuit defines a time interval after a zero crossing is detected during which any zero crossings detected by the estimating circuit are ignored. This position blanking circuit is a noise prevention circuit which inhibits the false detection of noise immediately after a zero crossing as another zero crossing. Preferably, the time interval would be adaptive, such as by being proportional to the advance angle. For example, bits A0, A1, A2 and A3 define the advance angle. The most significant bits, A2 and A3 could be used to control the length of the time interval, as illustrated in FIG. 2K.

INTEGRATED OVERCURRENT COMPARATOR

As shown in FIG. 2A, ASIC 100 also incorporates a comparator circuit including an analog comparator 212A and an overcurrent latch 212B for protecting the stator and other control circuitry in the event of abnormal currents developed as a result of a malfunction. The comparator circuit provides a fast protection response and a tighter control of the overcurrent activation level. In addition, the comparator circuit provides a substitute for the costly and less accurate implementations of overcurrent protection circuits in the prior art.

Figure 3A:
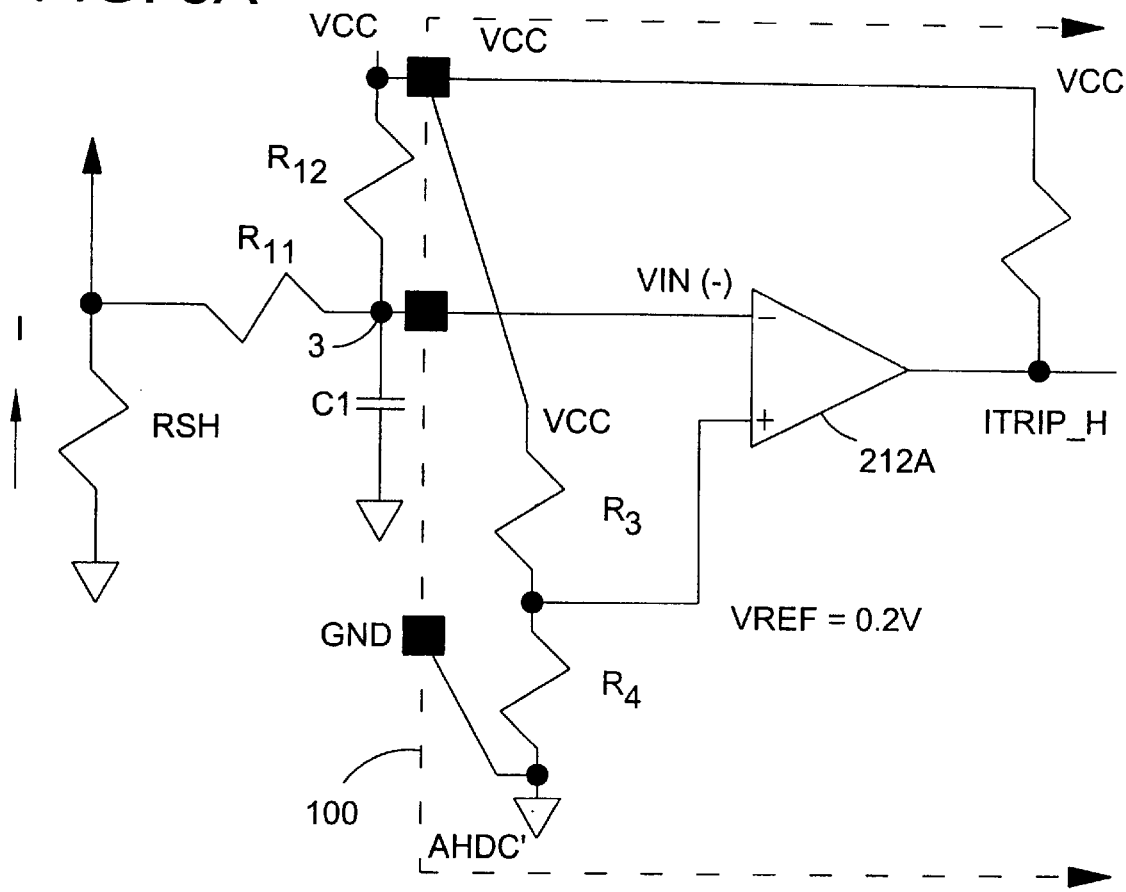
FIG. 3A is a schematic illustration of an overcurrent comparator 212A illustrating both the overcurrent-related internal components of the ASIC 100 and the external components connected to these internal components of the ASIC.

The overcurrent comparator is designed to protect motor and control against large currents that can be generated under fault conditions. Motor current is sensed by a resistor Rsh in series with one of the DC link buses feeding the inverter. FIG. 3A shows the implementation of the overcurrent comparator. Its internal voltage reference (Vref) is set at 0.2V. External resistors R11 and R12 set the desired current limit level sensed by resistor Rsh, and capacitor C1 provides means for filtering the signal sensed at resistor Rsh.

Motor current I circulates through resistor Rsh and the overcurrent level is set by divider resistors R11 and R12. Comparator 212A receives a current signal Vin(-) via Rsh which is representative of the current circulating through resistor Rsh. Comparator 212A compares the current signal Vin(-) to a reference (vref=0.2V) representative of a maximum current. Comparator 212A activates the overcurrent latch 212B to inhibit current application to the stator in the event that the applied current exceeds the maximum current. In particular, the output comparator signal (ITRIP_H) disables all the ASIC high voltage switch signals and sets an overcurrent latch condition. This action turns off all the inverter switches, forcing the fault current to decay towards zero. Capacitor C1 in combination with the equivalent resistance at node 3 provide a single stage of noise filtering.

Figure 3B:
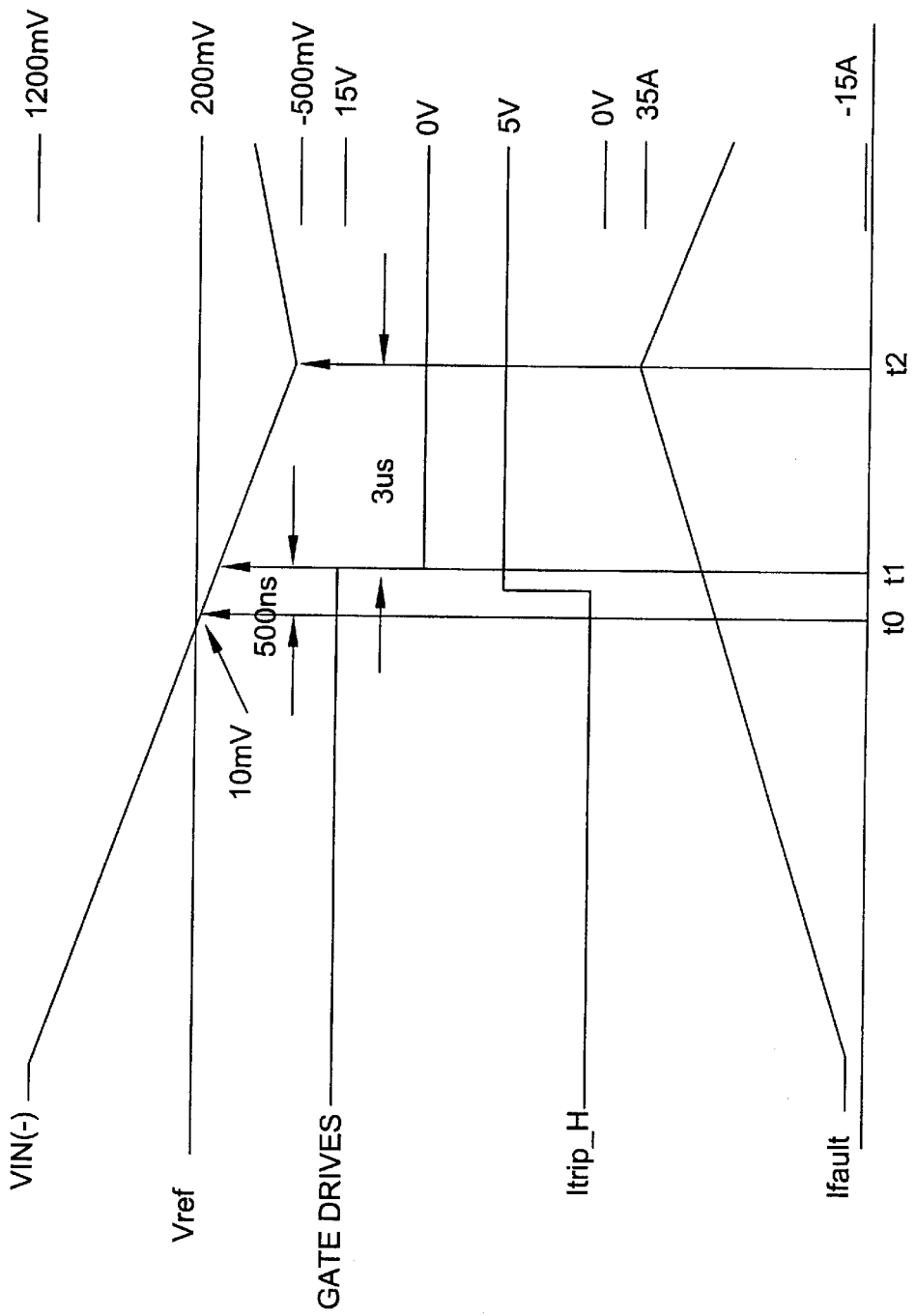
FIG. 3B is a waveform diagram relating to the overcurrent comparator and illustrates the comparator input Vin(−), gate drive control signals, comparator output Itrip_H and fault current Ifault.

FIG. 3B shows a sketch of the overcurrent comparator input voltage vin(-) when a fault current (I) circulates through resistor of 0.05 ohms value. At time t0 of FIG. 3B, the voltage developed across resistor Rsh causes the comparator input vin(-) to be less than Vref. This condition causes the comparator output ITRIP_H to change its state to a high logic level. After a propagation time interval of this signal, the enabled gate drives are forced to transition from a high level to a low level. After another propagation delay, at time t2, the power switches are turned OFF and the fault current starts to decay towards zero. Notice that as the power switches are commanded off, the fault current keeps increasing for a short time interval and consequently the comparator input vin(-) is exposed to negative voltage as indicated in top trace of FIG. 3B.

DYNAMIC MOTOR BRAKE

It is also contemplated that the ASIC 100 include dynamic braking in applications where the rotor 102R is driving a load such as blower 102B. In such applications, the dynamic braking speeds up the process of blower wheel balancing by permitting the blower and rotor to be braked more rapidly. In addition, the dynamic braking reduces blower noise as the blower wheel is coasted down to an operational rotating speed to a stop position. As shown in FIG. 2A, the dynamic braking feature is activated by a bit command loaded serially into the ASIC shift registers 204 from microcontroller 108 in response to a command from the user interface 106. This command instructs the ASIC 100 to configure the inverter power switches in a manner that the motor produces a braking torque. For example, dynamic braking may be accomplished by enabling simultaneously the lower inverter switches (lower switches closed) while all upper inverter switches are disabled (upper switches open). Dynamic braking can also be accomplished by closing the upper inverter switches and opening the lower ones.

At braking, the rotating mechanical energy of the load (e.g., the blower) is dissipated as heat. This energy is primarily dissipated in the stator winding, and in the inverter power devices. The rate at which the rotating energy is dissipated can be controlled by activating/deactivating the brake command. The microcontroller 108 intermittently provides low voltage output signals which result in enabling or closing the first switches and disabling or opening the second switches. As a result, the rate at which energy is dissipated in the stator in response to the dynamic braking signal is controlled by controlling a duty cycle of the low voltage output signals.

Another advantage of the dynamic brake feature is that it reduces audible noise of a blower/fan system at coast down. Coast down is defined as the uncontrollable slow down transition from a high speed to stand still. Blower/fan system resonances can be excited and audible noise can be generated by the natural decrease of blower speed at coast down. The slowdown transition time through the blower/fan system resonances can be controlled by a controlled speed reduction using the brake command.

Figure 4:
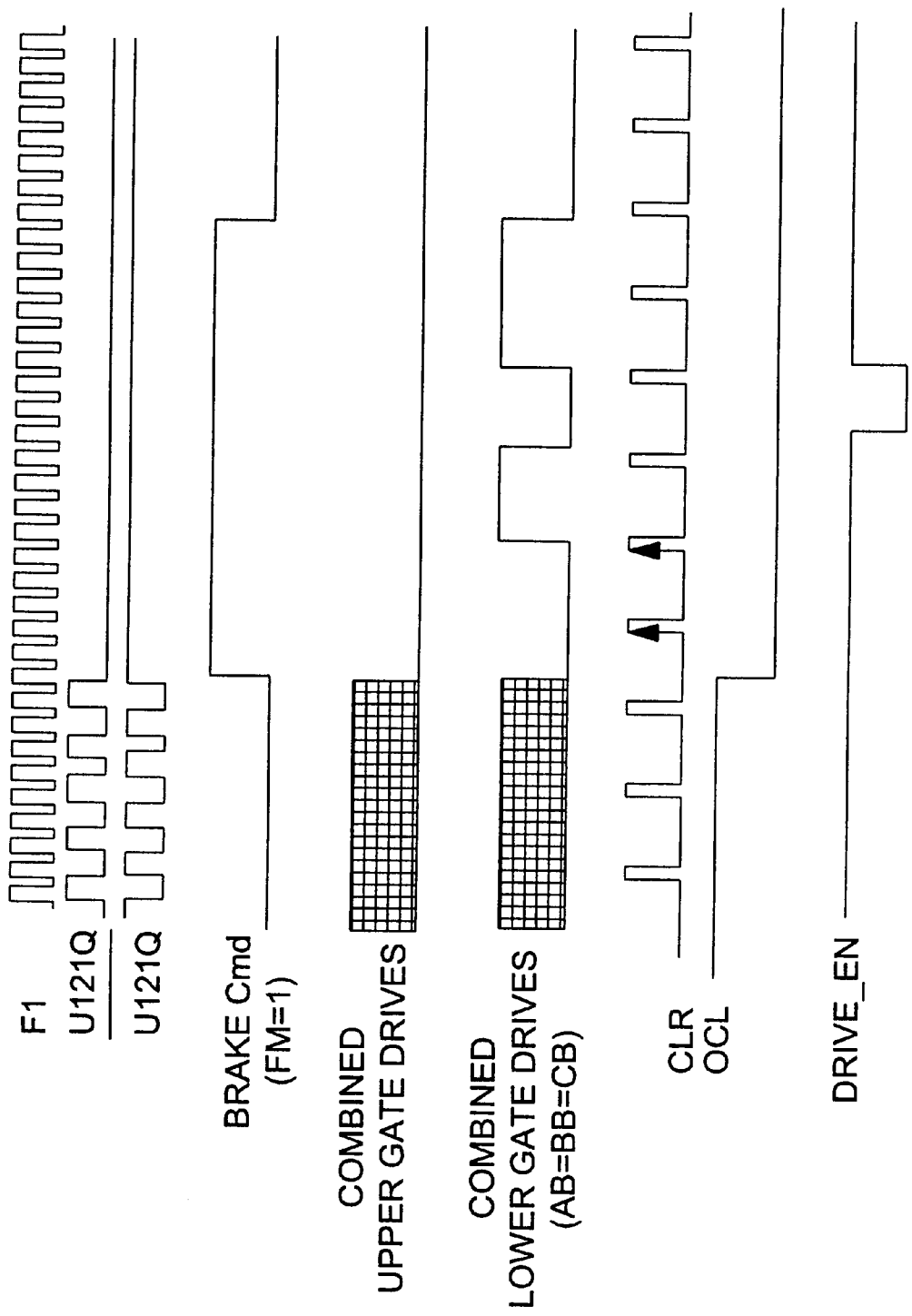
FIG. 4 illustrating the waveforms that accomplish dynamic braking according to the invention.

FIG. 4 shows some of the ASIC internal signals associated with the dynamic braking feature. A high level of signal frequency modulation (FM) indicates that the brake command is activated. Braking takes place when signals for the lower inverter switches are at high level (AB=BB=CB). The duty cycle of the modulated signal determines the braking rate. Signal CLR synchronizes the activation of the lower switches with the zero crossings of the motor back emf. Flip flop U121 (see FIG. 2C) is triggered by signal F1 and stops oscillating in response to the brake command to turn the upper switches OFF.

The upper switches become disabled as soon as the FM command is activated. Braking action can be controlled by the DRIVE_EN signal as indicated in FIG. 4.

POWER ON RESET

The ASIC includes a power on reset to protect the microcontroller from low voltages. The power on reset is used in conjunction with the undervoltage circuit which protects the switches from operating at low voltages which could damage the switches. In general, the power on reset disables the microcontroller if the supply voltage thereto is less than about 3.6 volts and the undervoltage circuit disables the switches if the control voltage thereto is less than about 11.66 volts at power up.

The power on reset circuit incorporated in the ASIC performs as follows.

Figure 11:
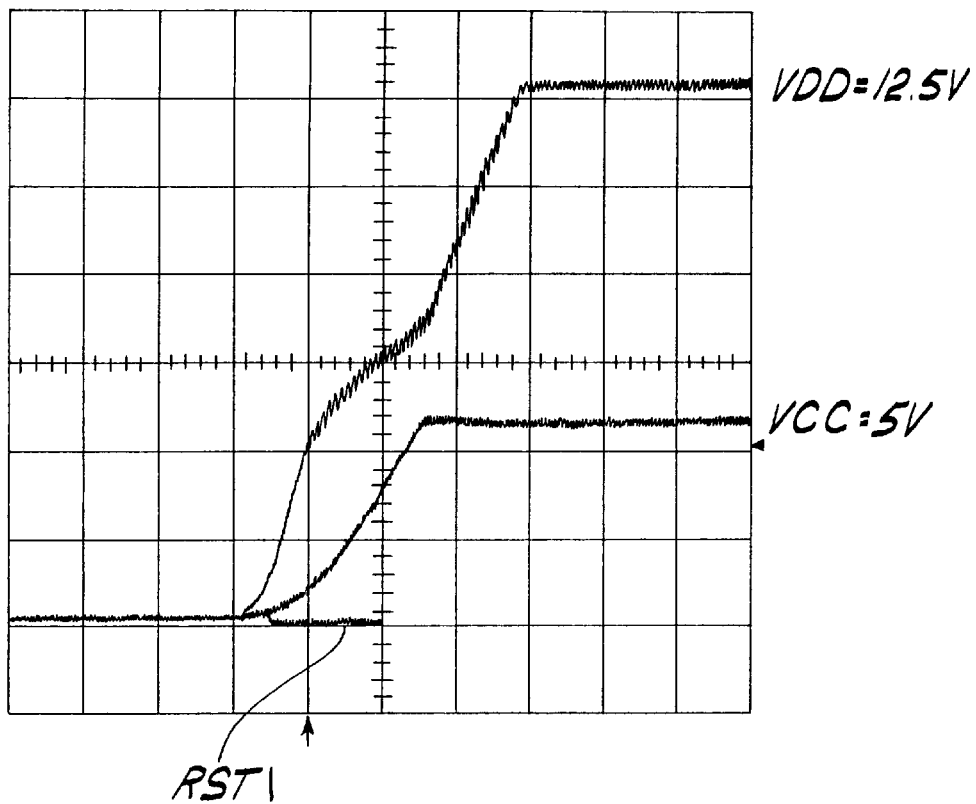
FIG. 11 illustrates a power up sequence according to the invention showing the input voltage VDD, the low voltage input VCC and the reset voltage output RST\.

At Power Up: As the input voltages VDD and VCC build up from zero, typical time waveforms are similar to the ones shown in FIG. 11. Supply voltage VCC comes out of an external +5V voltage regulator. The following events must happen as the input voltage increases. The circuit logic is held on reset and the open drain output RST\ must be kept pulled to a low logic level until the input voltage is greater than 3.6V. While the input voltage is building up, the high voltage gate drive signals (AT+, AT−, BT+, BT−, CT+, CT−, AB, BB, and CB) to control the inverter switches are forced to remain at low logical level. rhis is accomplished by setting the overcurrent latch 212B from FIG. 2A. As the high voltage input (VDD) is transitioning towards +15V, the high voltage gate drive signals are kept at low level. Once the high voltage input (+VDD) reaches a minimum voltage of +11.66V or a max. voltage of 13.15V, the gate drives are allowed to become enabled provided the overcurrent trip latch is reset. FIG. 11 shows a typical low voltage (+VCC) and high voltage (+VDD) input voltages when the control is powered up.

Figure 19:
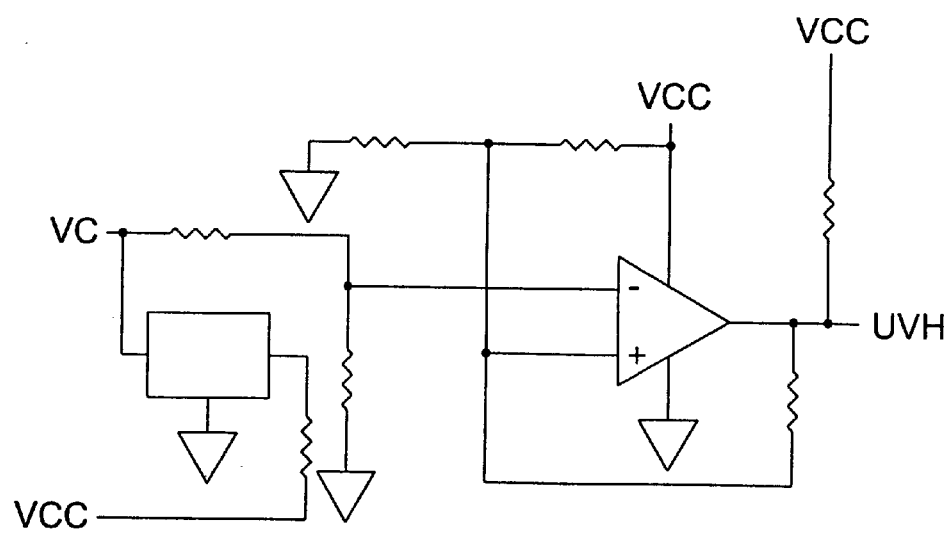
FIG. 19 is a schematic of one embodiment of the undervoltage detector.

At Power Down: As VDD and VCC decrease below the undervoltage level, the undervoltage circuit (see FIG. 19) brings the RST\ output low for a predefined time. When the supply VCC reaches an absolute min of 3.6V the RST\ output must be set at low level as long as VCC remains below 3.6V. The reset signal (RST\) is an output signal from the ASIC. When this signal is at low logic level, internally the ASIC logic is held in a reset condition, and externally the microcontroller is held in a reset condition.

Figure 12:
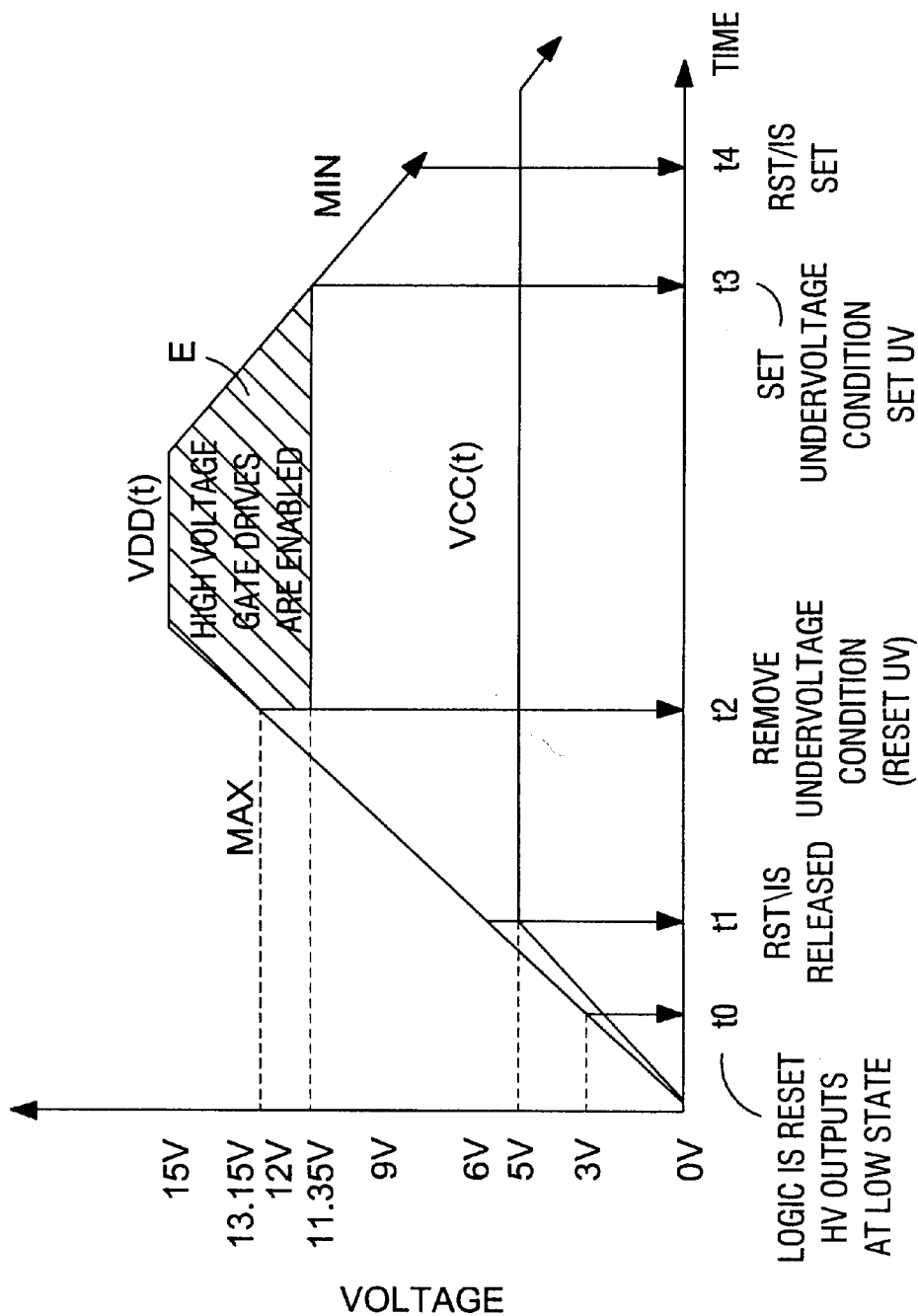
FIG. 12 illustrates the values of VDD and VCC over time according to the invention relating to undervoltage regulation.

The undervoltage detector is an important protection feature which prevents the inverter power switches from being activated when the control voltage is not adequate. An undervoltage condition is indicated by a high level of an internal signal called undervoltage signal UVH. At power up, the undervoltage condition is set (UVH=high) and the high voltage gate drives are kept disabled (all at low level) until the input voltage VDD is within the voltage range [11.66V–13.15V]. At power down, as soon as the decreasing high voltage input is in the range [11.35 V–12.8V] the undervoltage condition is set. FIG. 12 illustrates the events as the input voltages of VDD and VCC vary with time. Note that, at power up the undervoltage condition is set, and it must be removed at maximum voltage of 13.15V. At power down, the undervoltage condition is set, when the voltage reaches a minimum voltage level of 11.35V. The area E of FIG. 12 represents the area in which the high voltage gate drives are allowed to be enabled. At all other times, the high voltage gate drives must remain disabled. Note that the above voltage intervals above are associated with the tolerances of real circuits.

Depending on the duration of the undervoltage condition the following actions are taken. If the duration of the undervoltage condition is less than 6.6 ms, the signals that control the inverter switches are terminated in a cycle by cycle basis. This will protect the inverter switches by keeping them in an off state during the undervoltage condition. As soon as the undervoltage condition is removed, the inverter switches will resume operation. An undervoltage condition greater than 6.6 ms originates from the following: (a) The reset output signal RST\ is pulled down to a low logic level for a time interval of 430 uses, and (b) Control signals for the inverter switches are disabled (low level).

Figure 13:
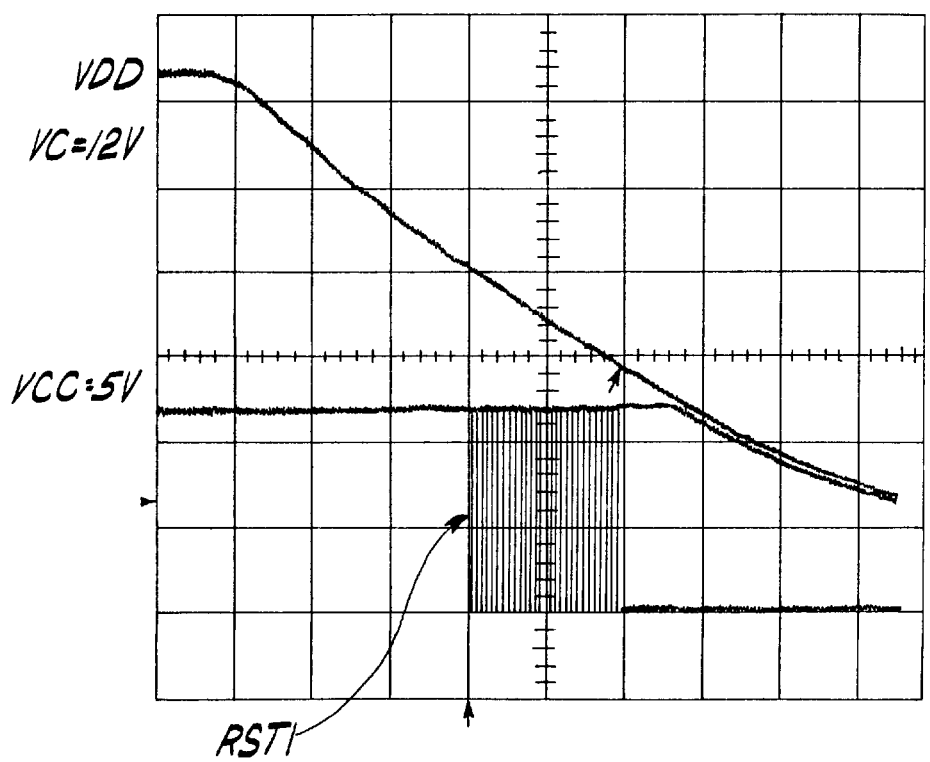
FIG. 13 illustrates a power down sequence according to the invention showing the high voltage input VDD also referred to as VC, the low voltage input VCC and the reset voltage output RST\.

FIG. 13 on the left shows the high voltage output VDD, low voltage supply VCC and reset output RST\ during power down. Reset output RST\ transitions from high to low in response to undervoltage condition longer or equal to 6.6 ms and remains at low level for about 430 us. As long as the input voltage (VDD) is in the low undervoltage region, the RST\ output goes to a low level every 6.6 ms as indicated in the figure. When the voltage falls below threshold, the RST\ changes its state to a low level and remains to the end of power down.

In view of the above, it will be seen that the several objects of the invention are achieved and other advantageous results attained.

As various changes could be made in the above products without departing from the scope of the invention, it is intended that all matter contained in the above description and shown in the accompanying drawings shall be interpreted as illustrative and not in a limiting sense.

What is claimed is:

1. A motor for use with a power supply providing nominally up to about a 450 volt signal for powering the motor, said motor comprising:

a stator;

a rotor in magnetic coupling relation to the stator;

a plurality of insulated gate bipolar transistors (IGBTs), each having a control input port, said IGBTs connected between the stator and the power supply for selectively applying power to the stator in response to a control signal applied to the control input port;

a user interface for providing user signals indicative of one or more desired operating parameters of the motor;

a microcontroller having control inputs receiving the user signals and having low voltage output ports for providing low voltage output signals ranging from about zero volts to about five (5) volts for commutating the stator as a function of the user signals; and a high voltage silicon application specific integrated circuit (ASIC) having low voltage input ports connected to the low voltage output ports of the microcontroller and having high voltage output ports connected to the control input ports of the IGBTs, said ASIC providing via its high voltage output ports high voltage control signals ranging from about zero to about fifteen (15) volts which high voltage control signals are in response to the low voltage output signals provided by the microcontroller.

2. The motor of claim 1 further comprising a power on reset circuit for disabling the switches in the event that a supply voltage for the microcontroller is below a preset minimum.

3. The motor of claim 14 further comprising an undervoltage circuit for disabling the IGBTs in the event that a control voltage for the IGBTs is below a required minimum.

4. A motor for use with a power supply comprising:

a stator;

a rotor in magnetic coupling relation to the stator;

a plurality of inverter powers switches (IVPs), each having a control input port, said IVPs connected between the stator and the power supply for selectively applying power to the stator in response to a control signal applied to the control input port;

a user interface for providing user signals indicative of one or more desired operating parameters of the motor;

a microcontroller having control inputs receiving the user signals and having low voltage output ports for providing low voltage output signals for commutating the stator as a function of the user signals; and a high voltage silicon application specific integrated circuit (ASIC) having low voltage input ports connected to the low voltage output ports of the microcontroller and having high voltage output ports connected to the control input ports of the IVPs, said ASIC providing high voltage control signals via its high voltage output ports which high voltage control signals are in response to the low voltage output signals provided by the microcontroller wherein the ASIC comprises a back emf sensing circuit connected to the stator providing a position signal indicative of the position of the rotor relative to the stator, wherein the back emf sensing circuit provides a zero crossing signal indicative of zero crossings of the back emf signal and wherein the ASIC includes an estimating circuit for estimating the commutation instant based on the length of the previous interval between two consecutive zero crossings, said ASIC commutating said stator as a function of the previous interval.

5. The motor of claim 4 including a bidirectional state machine circuit responsive to the estimating circuit and a current regulator responsive to the bidirectional state machine circuit for selectively opening and closing the IVPs for selectively applying power to the stator.

6. The motor of claim 5 wherein the current regulator includes a regulating circuit which applies current to the stator on a pulse by pulse basis and at selectable pulse modulating frequencies.

7. The motor of claim 4 wherein the plurality of switches each comprise an insulated gate bipolar transistor (IGBT) and wherein the power supply provides nominally up to about a 450 volt signal via a voltage source inverter for powering the motor, wherein the low voltage output signals each comprises a signal ranging from about zero volts to about five (5) volts and wherein the high voltage control signals applied to the IGBTs each comprises a signal ranging from about zero to about fifteen (15) volts, and further comprising blanking circuit defining a time interval after a zero crossing is detected during which any zero crossings detected by the estimating circuit are ignored.

8. The motor of claim 4 wherein the stator has a winding having three phases, wherein the plurality of switches include a first switch connected to one side of each phase and a second switch connected to the other side of each phase and wherein the microcontroller, in response to a dynamic braking signal from the user interface, provides low voltage output signals which result in enabling or closing the first switches and disabling or opening the second switches.

9. The motor of claim 4 including a bidirectional state machine circuit responsive to the estimating circuit and a current regulator responsive to the bidirectional state machine circuit for selectively opening and closing the plurality of switches for selectively applying power to the stator.

10. The motor of claim 9 wherein the power supply provides nominally up to about a 450 volt signal via a voltage source inverter for powering the motor and wherein the current regulator includes a regulating circuit which applies current to the stator on a pulse by pulse basis and at selectable pulse modulating frequencies as a function of current in a shunt resistor on a DC link bus feeding the inverter.

11. A motor for use with a power supply including a voltage source inverter comprising:

a stator;

a rotor in magnetic coupling relation to the stator;

a resistor on a DC link bus feeding the inverter;

a plurality of inverter powers switches (IVPs), each having a control input port, said IVPs connected between the stator and the power supply for selectively applying power to the stator in response to a control signal applied to the control input port;

a user interface for providing user signals indicative of one or more desired operating parameters of the motor;

a microcontroller having control inputs receiving the user signals and having low voltage output ports for providing low voltage output signals for commutating the stator as a function of the user signals; and a high voltage silicon application specific integrated circuit (ASIC) having low voltage input ports connected to the low voltage output ports of the microcontroller and having high voltage output ports connected to the control input ports of the IVPs, said ASIC providing high voltage control signals via its high voltage output ports which high voltage control signals are in response to the low voltage output signals provided by the microcontroller wherein the ASIC comprises a comparator circuit receiving a current signal representative of the current circulating through the resistor and comparing the current signal to a reference representative of a maximum current, said comparator circuit inhibiting all power switches in the event that the applied current exceeds the maximum current and wherein the ASIC further comprises a current regulating circuit responsive to the current signal representative of the current circulating through the resistor which regulating circuit which applies current to the stator on a pulse by pulse basis and at selectable pulse modulating frequencies as a function of the current circulating through the resistor.

12. A motor for use with a power supply comprising:

a stator having a winding having three phases;

a rotor in magnetic coupling relation to the stator;

a plurality of inverter powers switches (IVPs), each having a control input port, said IVPs connected between the stator and the power supply for selectively applying power to the stator in response to a control signal applied to the control input port, wherein the IVPs include a first switch connected to one side of each phase and a second switch connected to the other side of each phase;

a user interface for providing user signals indicative of one or more desired operating parameters of the motor;

a microcontroller having control inputs receiving the user signals and having low voltage output ports for providing low voltage output signals for commutating the stator as a function of the user signals, wherein the microcontroller, in response to a dynamic braking signal from the user interface, intermittently provides low voltage output signals which result in enabling or closing the first switches and disabling or opening the second switches at a rate at which energy dissipated in the stator in response to the dynamic braking signal is controlled by controlling a duty cycle of the low voltage output signals that enable braking;

a high voltage silicon application specific integrated circuit (ASIC) having low voltage input ports connected to the low voltage output ports of the microcontroller and having high voltage output ports connected to the control input ports of the IVPs, said ASIC providing high voltage control signals via its high voltage output ports which high voltage control signals are in response to the low voltage output signals provided by the microcontroller wherein the ASIC comrprises a back emf sensing circuit connected to the stator providing a position signal indicative of the position of the rotor relative to the stator, and wherein the back emf sensing circuit provides a zero crossing signal indicative of zero crossing of the back emf, signal; and wherein the micrrocontroller synchronizes the dynamic braking signal with the zero crossing signal.

13. The motor of claim 12 wherein the IVPs each comprise an insulated gate bipolar transistor (IGBT) and wherein the power supply provides nominally up to about a 450 volt signal via a voltage source inverter for powering the motor, wherein the low voltage output signals each comprises a signal ranging from about zero volts to about five (5) volts and wherein the high voltage control signals applied to the IGBTs each comprises a signal ranging from about zero to about fifteen (15) volts.

14. The motor of claim 12 wherein the ASIC comprises a back emf sensing circuit connected to the stator providing a position signal indicative of the position of the rotor relative to the stator, wherein the back emf sensing circuit provides a zero crossing signal indicative of zero crossings of the back emf signal and wherein the ASIC includes an estimating circuit for estimating the commutation instant based on the length of the previous interval between two consecutive zero crossings, said ASIC commutating said stator as a function of the previous interval.

15. The motor of claim 14 including a bidirectional state machine circuit responsive to the estimating circuit and a current regulator responsive to the bidirectional state machine circuit for selectively opening and closing the IVPs for selectively applying power to the stator.

16. The motor of claim 15 wherein the current regulator includes a regulating circuit which applies current to the stator on a pulse by pulse basis and at selectable pulse modulating frequencies.

17. The motor of claim 12 wherein the ASIC comprises a comparator circuit receiving a current signal representative of the current circulating through a resistor on a DC link bus feeding the inverter and comparing the current signal to a reference representative of a maximum current, said comparator circuit inhibiting all power switches in the event that the applied current exceeds the maximum current.

* * * * *